US010609766B2

(12) United States Patent
Cho et al.

(10) Patent No.: US 10,609,766 B2
(45) Date of Patent: Mar. 31, 2020

(54) HEATER FOR ELECTRONIC THERMOSTAT AND METHOD FOR MANUFACTURING THE SAME

(71) Applicant: WOO JIN IND. CO., LTD., Ansan-si, Gyeonggi-do (KR)

(72) Inventors: Young Jin Cho, Ansan-si (KR); Ki Won Kim, Gunpo-si (KR); Si Hyuck Ryu, Ansan-si (KR)

(73) Assignee: WOO JIN IND. CO., LTD., Ansan-si, Gyeonggi- (KR)

( * ) Notice: Subject to any disclaimer, the term of this patent is extended or adjusted under 35 U.S.C. 154(b) by 1239 days.

(21) Appl. No.: 14/553,990

(22) Filed: Nov. 25, 2014

(65) Prior Publication Data

US 2015/0351157 A1 Dec. 3, 2015

(30) Foreign Application Priority Data

Jun. 2, 2014 (KR) .................. 10-2014-0066793
Aug. 4, 2014 (KR) .................. 10-2014-0099982

(51) Int. Cl.
| H05B 3/18 | (2006.01) |
| H05B 3/00 | (2006.01) |
| H05B 3/06 | (2006.01) |
| H05B 3/03 | (2006.01) |
| H05B 3/44 | (2006.01) |
| B23K 11/00 | (2006.01) |

(Continued)

(52) U.S. Cl.
CPC ........ H05B 3/0014 (2013.01); B23K 11/0026 (2013.01); B23K 26/20 (2013.01); H05B 3/03 (2013.01); H05B 3/06 (2013.01); H05B 3/44 (2013.01); H05B 3/48 (2013.01); *Y10T 29/49085* (2015.01)

(58) Field of Classification Search
None
See application file for complete search history.

(56) References Cited

U.S. PATENT DOCUMENTS 1,738,026 A * 12/1929 Wennagel ............... H05B 3/48
219/542
3,071,748 A * 1/1963 Lucia ....................... H05B 3/42
338/268

(Continued)

FOREIGN PATENT DOCUMENTS

DE  102013212205 A1 * 12/2014 ............... H01C 1/02
KR    20130114505 A  * 10/2013 ............... F01P 7/00

OTHER PUBLICATIONS

DE 102013212205 A1, Schlipf, 21-2014, partial translation.*

Primary Examiner — Joseph M Pelham
(74) Attorney, Agent, or Firm — Park, Kim & Suh, LLC

(57) ABSTRACT

Disclosed is a heater for an electronic thermostat, in which response is improved so that time taken in increasing a heating temperature up to a target temperature can be reduced, and an effect on improving fuel efficiency of a vehicle is maximized through effective temperature control of a coolant, and a method of manufacturing the same. Further, there is provided a heater for an electronic thermostat, which is structurally simple, is improved in workability and productivity for mass production when manufactured and assembled, reduces production costs, and enhances durability and reliability when applied to the thermostat for controlling a temperature of a coolant, and a method of manufacturing the same.

11 Claims, 19 Drawing Sheets

(51) Int. Cl.
*B23K 26/20* (2014.01)
*H05B 3/48* (2006.01)

(56) References Cited

U.S. PATENT DOCUMENTS

| | | | | |
|---|---|---|---|---|
| 4,593,182 A * | 6/1986 | Schwarzkopf | ........... | H05B 3/48 219/523 |
| 5,034,595 A * | 7/1991 | Grendys | ................. | H05B 3/06 219/541 |
| 5,247,158 A * | 9/1993 | Steinhauser | ............ | H05B 3/46 219/534 |
| 6,191,400 B1* | 2/2001 | Cunningham | ........... | H05B 3/48 219/543 |
| 2007/0023418 A1* | 2/2007 | Schlipf | .................... | H05B 3/04 219/532 |
| 2010/0147826 A1* | 6/2010 | Schlipf | .................... | H05B 3/48 219/481 |
| 2011/0056931 A1* | 3/2011 | Schlipf | ............... | B29C 45/2737 219/548 |
| 2017/0071033 A1* | 3/2017 | Schlipf | ................ | H05B 1/0205 |
| 2017/0114703 A1* | 4/2017 | Kim | ........................ | F01P 7/167 |

\* cited by examiner

400a

HEATER FOR ELECTRONIC THERMOSTAT AND METHOD FOR MANUFACTURING THE SAME

CROSS-REFERENCE TO RELATED APPLICATION

This application claims priority to and the benefit of Korean Patent Application No. 10-2014-0066793 filed in the Korean Intellectual Property Office on Jun. 2, 2014 and Korean Patent Application No. 10-2014-0099982 filed in the Korean Intellectual Property Office on Aug. 4, 2014, the entire contents of which are incorporated herein by reference.

BACKGROUND OF THE INVENTION (a) Field of the Invention

The present invention relates to a heater, and more particularly to a heater for an electronic thermostat used for cooling an engine for a vehicle and a method of manufacturing the same.

(b) Description of the Related Art

In general, an engine has a high temperature of about 2000~2500° C. during a combustion process. At this time, a considerable amount of heat is transferred to a cylinder wall, a cylinder head, a piston valve, etc. of the engine, and therefore the strength of parts is weakened, thereby causing troubles or shortened lifespan, and generating defective combustion such as knocking or pre-ignition.

Further, if the engine is excessively cooled, heat loss is so high that the efficiency of the engine decreases and thus fuel consumption increases. Accordingly, a vehicle typically includes a thermostat to maintain a coolant temperature of the engine at about 80~90° C.

The thermostat is installed in between the engine and a radiator, and makes displacement of a valve in accordance with variation in the coolant temperature in order to an amount of coolant flowing toward the radiator, thereby maintaining the coolant at a proper temperature.

That is, the thermostat makes the displacement of the valve so that the coolant can circulate in the radiator if the coolant temperature is equal to or higher than a setting temperature, and closes the valve so that the coolant can circulate through a bypass channel without circulating the radiator if the coolant temperature is lower than the setting temperature.

Most of conventional thermostats for a vehicle are a mechanical thermostat having a structure in which expansion force of wax expanding in proportional to the temperature of the coolant is transferred to a piston to thereby open/close the valve.

Such a mechanical thermostat simply operates to open and close the valve in accordance with the expansion of the wax under conditions of the setting temperature, and thus has a limit to positively correspond to changes in driving circumstances or other conditions of the vehicle in light of trend toward high performance and high efficiency.

Cooling performance of a vehicle has been designed taking a full load of the vehicle, but an actual load of the vehicle is not more than 70% of the full load. Therefore, the engine is super-cooled more than needs when it is actually driven, thereby decreasing fuel efficiency and deteriorating emission.

Accordingly, there is a need of control technology for maintaining an optimum coolant temperature by increasing the coolant temperature under a driving condition of a partial load, and decreasing the coolant temperature under a driving condition of the full load.

To make up for the disadvantages of the mechanical thermostat that operates based on the expansion of the wax, an electronic thermostat using a variable control method of artificially controlling the expansion of the wax has been developed and mounted to a practical vehicle.

Such an electronic thermostat controls the expansion of the wax by adjusting a heat generation rate of the heater in accordance with driving or load circumstances of the vehicle, and thus controls a flux of the coolant circulating in the radiator by adjusting an opened state of the valve, thereby variably controlling the coolant temperature and accomplishing improved fuel efficiency and stabilized emission.

However, a conventional electronic thermostat cannot control the temperature of the coolant in real time since it takes quite long time to increase the temperature of the heater to a target temperature, and cannot maximally improve the fuel efficiency of the vehicle.

For example, the conventional electronic thermostat has a structure of accommodating the wax, including a built-in heater of a film resistance type or the like, supplying electric power to the heater to generate heat, expanding the wax by heat of the heater, and pushes the piston by the expansion force, thereby operating the valve.

However, in the conventional electronic thermostat using the film resistance type heater or other heaters as described above, it takes much time (e.g., 50~70 sec) to reach a target temperature (e.g., 300~350° C.).

Accordingly, a heater for a thermostat is required to have a new structure capable of improving response so that time taken in increasing the heating temperature up to the target temperature can be shortened, thereby more effectively controlling the temperature of the coolant than the existing mechanical or electronic thermostat.

Further, there is a need of a heater for a thermostat, which is structurally simple, is improved in workability and productivity when manufactured and assembled, reduces production costs, and enhances durability and reliability when applied to the thermostat for controlling the temperature of the coolant.

SUMMARY OF THE INVENTION

Accordingly, the present invention is conceived to solve the forgoing problems, and an aspect of the present invention is to provide a heater for an electronic thermostat, in which response is improved so that time taken in increasing a heating temperature up to a target temperature can be reduced, and an effect on improving fuel efficiency of a vehicle is maximized through effective temperature control of a coolant, and a method of manufacturing the same.

Another aspect of the present invention is to provide a heater for an electronic thermostat, which is structurally simple, is improved in workability and productivity for mass production when manufactured and assembled, reduces production costs, and enhances durability and reliability when applied to the thermostat for controlling a temperature of a coolant, and a method of manufacturing the same.

In accordance with an aspect of the present invention, there is provided a heater for an electronic thermostat, including: a tube which includes a hollow structure of which one side is opened and the other side is closed; a first lead line which includes a first end portion exposed to an outside of the tube and a second end portion placed inside the tube and receives electric power from an exterior through the first end portion exposed to the outside of the tube; a second lead line which includes a first end portion exposed to the outside of the tube and a second end portion placed inside the tube and is installed to be spaced apart from the first lead line; a heating coil which electrically connects the first lead line and the second lead line and generates heat based on electrical resistance; an insulation material which is filled in an inner space of the tube; and a packing which is installed inside a mouth of the tube and made of an insulating substance serving as a support for supporting and maintaining the first lead line and the second lead line to be spaced apart from each other.

The heating coil may include a first end connected to a front end portion of the first lead line inside the tube and a second end connected to a front end portion of the second lead line inside the tube, and may be shaped like a 'U'-shape.

The connection between the first end of the heating coil and the front end portion of the first lead line inside the tube, and the connection between the second end of the heating coil and the front end portion of the second lead line inside the tube may be achieved by respectively inserting both ends of the heating coil having the 'U'-shape in the first lead line and the second lead line, and applying electric resistance welding or laser welding to the inserted portions. The first lead line and the second lead line placed inside the tube may be configured to have the same length.

The heater for the electronic thermostat may further include a spacer which is made of an insulating substance and secures insulation by preventing contact between the heating coil and an inner circumference of the tube or between the first lead line and the second lead line.

The heater for the electronic thermostat may further include an insulation pipe which is shaped like a pipe and installed for securing insulation in the first lead line and the second lead line placed inside the tube. In addition, the heater for the electronic thermostat may further include an insulation ring for securing insulation between a lower end portion of the heating coil inside the tube and a lower end portion of the tube.

The heater for the electronic thermostat may further include fitting which is formed with a screw thread on an outer circumference thereof and put on the outside of the tube through press-fitting so that the heater can be screw-coupled to the heater mounting portion.

The heater for the electronic thermostat may further include a cap which is made of an insulating substance and provided in a mouth portion of the fitting so as to close the mouth portion of the fitting while supporting portions of the first and second lead lines exposed to the outside of the tube.

Further, the second lead line placed inside the tube may be shorter than the first lead line.

The heating element may include a heating coil which has a first end connected to a front end portion of the first lead line inside the tube, and a second end connected to a front end portion of the second lead line inside the tube, and may be spaced apart from the first lead line while surrounding the first lead line.

The connection between the first end of the heating coil and the front end portion of the first lead line inside the tube, and the connection between the second end of the heating coil and the front end portion of the second lead line inside the tube may be achieved by electric resistance welding or laser welding.

The heater for the electronic thermostat may further include spacers respectively provided for preventing contact and securing insulation between the first lead line inside the tube and the heating coil, between the heating coil and the tube, and between the first lead line and the second lead line.

The heater for the electronic thermostat may further include a spacer which is made of an insulating substance and secures insulation between the tube and the first lead line and between the tube and the second lead line.

The heater for the electronic thermostat may further include a first insulation pipe for securing insulation between a partial region of the first lead line placed inside the tube and the heating coil. The heater for the electronic thermostat may further include a second insulation pipe for securing insulation between the tube and the heating coil placed inside the tube. The second insulation pipe may be extended up to a portion beneath the packing so as to secure insulation between the tube and the first lead line placed above the heating coil and between the tube and the second lead line placed above the heating coil.

The heater for the electronic thermostat may further include an insulation ring provided under the front end portion of the first lead line placed inside the tube and securing insulation between the front end portion of the first lead line and the tube.

In accordance with another aspect of the present invention, there is provided a method of manufacturing a heater for an electronic thermostat, the method including: preparing a tube including a hollow structure of which one side is opened and the other side is closed; preparing a first lead line and a second lead line to be inserted in the tube; preparing a 'U'-shaped heating coil bent with respect to a middle of a coil spring; connecting a first end of the 'U'-shaped heating coil with the first lead line and a second end of the heating coil with the second lead line; inserting the heating coil and the first and second lead lines connected to the heating coil in the tube; filling the tube with an insulation material; and installing packing made of an insulating substance at an opened mouth of the tube.

In accordance with another aspect of the present invention, there is provided a method of manufacturing a heater for an electronic thermostat, the method including: preparing a tube including a hollow structure of which one side is opened and the other side is closed; preparing a first lead line and a second lead line to be inserted in the tube; coupling a first end of a heating coil with the first lead line and coupling a second end of the heating coil with the second lead line in the state that the heating coil is put on the first lead line to surround the first lead line; inserting the heating coil and the first and second lead lines coupled to the heating coil in the tube; filling the tube with an insulation material; and installing packing made of an insulating substance at an opened mouth of the tube.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF THE EMBODIMENTS

Hereinafter, exemplary embodiments according to the present invention will be described with reference to FIGS. 1 to 19.

Embodiment 1

Figure 1:
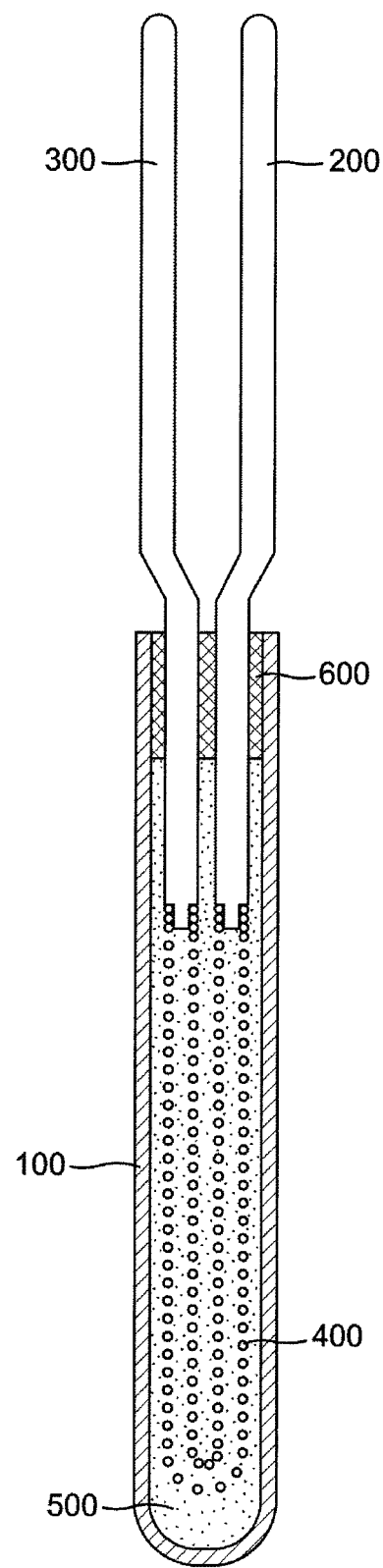
FIG. 1 is a sectional view showing a structure of a heater for an electronic thermostat according to a first embodiment of the present invention.
Figure 2:
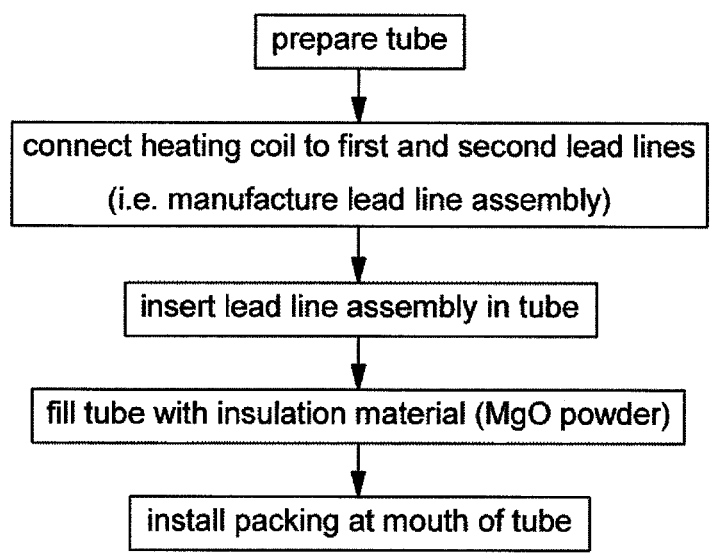
FIG. 2 is a flowchart showing processes of manufacturing the heater for the electronic thermostat of FIG. 1.
Figure 10:
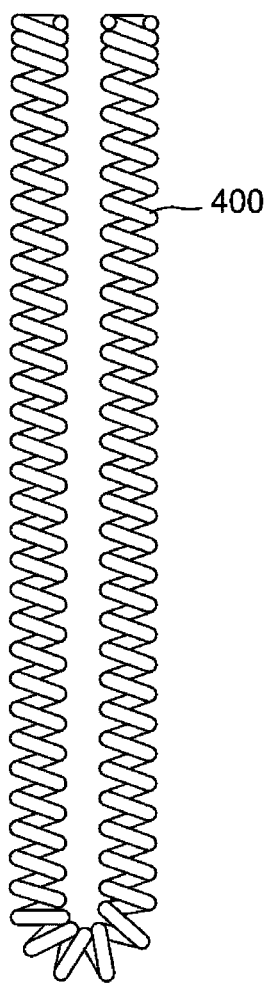
FIG. 10 is a front view of a heating coil applied to the first to fourth embodiments of the present invention.

FIG. 1 is a sectional view showing a structure of a heater for an electronic thermostat according to a first embodiment of the present invention, FIG. 2 is a flowchart showing processes of manufacturing the heater for the electronic thermostat of FIG. 1, and FIG. 10 is a front view of a heating coil of FIG. 1.

Referring to FIG. 1 and FIG. 10, the heater for the electronic thermostat according to the first embodiment of the present invention includes a tube 100 having a hollow structure of which one side is opened and the other side is closed; a first lead line 200 having a first end portion exposed to an outside of the tube 100 and a second end portion placed inside the tube 100 and receiving electric power from an exterior through the first end portion exposed to the outside of the tube 100; a second lead line 300 having a first end portion exposed to the outside of the tube 100 and a second end portion placed inside the tube 100 and spaced apart from the first lead line 200; a heating coil 400 electrically connecting the first lead line 200 and the second lead line 300 and generating heat based on electrical resistance; an insulation material 500 filled in an inner space of the tube 100; and a packing 600 installed inside a mouth of the tube 100 and made of an insulating substance serving as a support for supporting and maintaining the first lead line 200 and the second lead line 300 to be spaced apart from each other.

The heating coil 400 is a coil that has a first end connected to a front end portion of the first lead line 200 inside the tube 100, and a second end connected to a front end portion of the second lead line 300 inside the tube 100, and is shaped like a 1Y-shape.

That is, the heating coil 400 has a geometrical structure where a winding portion of a coil spring structure is bent in the form of a 'U'-shape, and thus both ends of the heating coil having the 'U'-shape are respectively connected to the first lead line 200 and the second lead line 300.

The connection between the first end of the heating coil 400 and the front end portion of the first lead line 200 inside the tube 100, and the connection between the second end of the heating coil 400 and the front end portion of the second lead line 300 inside the tube 100 are achieved by respectively inserting both ends of the heating coil having the 'U'-shape in the first lead line 200 and the second lead line 300, and applying electric resistance welding or laser welding to the inserted portions.

Substantially, both ends of the heating coil 400 have to be inserted in the front end portions of the first lead line 200 and the second lead line 300 before the welding. To improve the insertion and prevent separation before the welding, both ends of the heating coil 400 may be tapered. The insulation material 500 filled in the tube 100 may include magnesium oxide (MgO) powder, but not limited thereto.

As the geometrical structure of the heating coil 400 has the 'U'-shape, the first lead line 200 and the second lead line 300 placed inside the tube 100 are configured to have the same length.

The first lead line 200 and the second lead line 300 penetrate the packing 600 at the mouth of the tube 100, being bilaterally symmetrical with respect to a central axis along a lengthwise direction of the tube 100.

Below, processes of manufacturing the heater for the electronic thermostat, with the foregoing configuration according to this embodiment of the present invention, will be described with reference to FIGS. 1, 2 and 10.

First, the tube 100 having the hollow structure, of which one side is opened and the other side is closed, is prepared. Then, the first lead line and the second lead line 300 to be inserted in the tube 100 are prepared.

Further, the 'U'-shaped heating coil 400 bent with respect to the middle of the coil spring is prepared. Then, the first end of the 'U'-shaped heating coil 400 and the first lead line 200 are connected, and the second end of the 'U'-shaped heating coil 400 and the second lead line 300 are connected, thereby forming a lead line assembly.

The connection between the first end of the 'U'-shaped heating coil 400 and the first lead line 200, and the connection between the second end of the heating coil 400 and the second lead line 300 may be achieved by respectively inserting both ends of the heating coil having the 'U'-shape in the first lead line 200 and the second lead line 300, and applying electric resistance welding or laser welding to the inserted portions. Thus, both ends of the heating coil having the 'U'-shape are welded to the first lead line 200 and the second lead line 300, respectively.

Next, the assembly of the first lead line 200 and the second lead line 300 welded to the heating coil 400 (i.e. the lead line assembly) are inserted in the tube 100. Subsequently, the tube 100 is filled with the insulation material 500 such as MgO powder by ultrasonic vibrations. Then, the packing 600 made of the insulating substance is installed at the opened mouth of the tube 100.

Through the foregoing processes, the heater for the electronic thermostat according to the first embodiment of the present invention is manufactured, and the heater for the electronic thermostat with the foregoing configuration according to this embodiment of the present invention uses a portion of the tube 100 as the thermostat and is fixed to a wax casing (not shown) internally filled with wax.

According to the first embodiment of the present invention, the heater for the electronic thermostat manufactured as described above has effects as follows.

On the contrary to a conventional heater, there is no need of a fitting for fastening the heater to a heater mounting portion, so that the structure and the process can be simplified, and production costs can be reduced. That is, it is possible to effectively reduce an outer diameter since the heater for the electronic thermostat according to the first embodiment of the present invention does not need a fitting for mounting the heater to the heater mounting portion (e.g., the wax casing) through screw fastening, and it is also possible to decrease the number of parts and an assembling efficiency since the insulation body, the O-ring and the annular nut are not needed due to the elimination of the fitting.

The heater for the electronic thermostat according to this embodiment has a structure where the first lead line 200 and the second lead line 300 for supplying the electric power are insulated from the tube 100, and therefore foreign materials are prevented from being attached to a valve operating portion on outer walls of parts on the contrary to the existing heater for the thermostat.

In other words, the existing heater for the thermostat has the structure where the heating coil and the tube are electrically connected, the tube is electrically connected to the fitting, and the fitting is grounded to a chassis, and therefore electrolysis of a coolant including antifreeze and water based on electric conductivity between the fitting and the wax casing makes foreign materials be attached to the valve operating portion and may cause a malfunction of the electronic thermostat. On the other hand, the heater for the thermostat according to this embodiment of the preset invention fundamentally prevents the electrolysis of the coolant since the tube 100 and the heating coil 400 are insulated from each other.

Accordingly, the heater for the electronic thermostat according to this embodiment has an effect on improving the durability and operation reliability of the electronic thermostat since there is no problem of foreign materials attached to the valve operating portion due to the electrolysis of the coolant.

Further, the heater for the electronic thermostat according to this embodiment employs the 'U'-shaped heating coil 400 for easily connecting the heating coil to the first lead line 200 and the second lead line 300, thereby simplifying the structure and the process of the heater for the thermostat, improving workability and productivity for mass production when manufactured and assembled, and reducing production costs.

Embodiment 2

Figure 3:
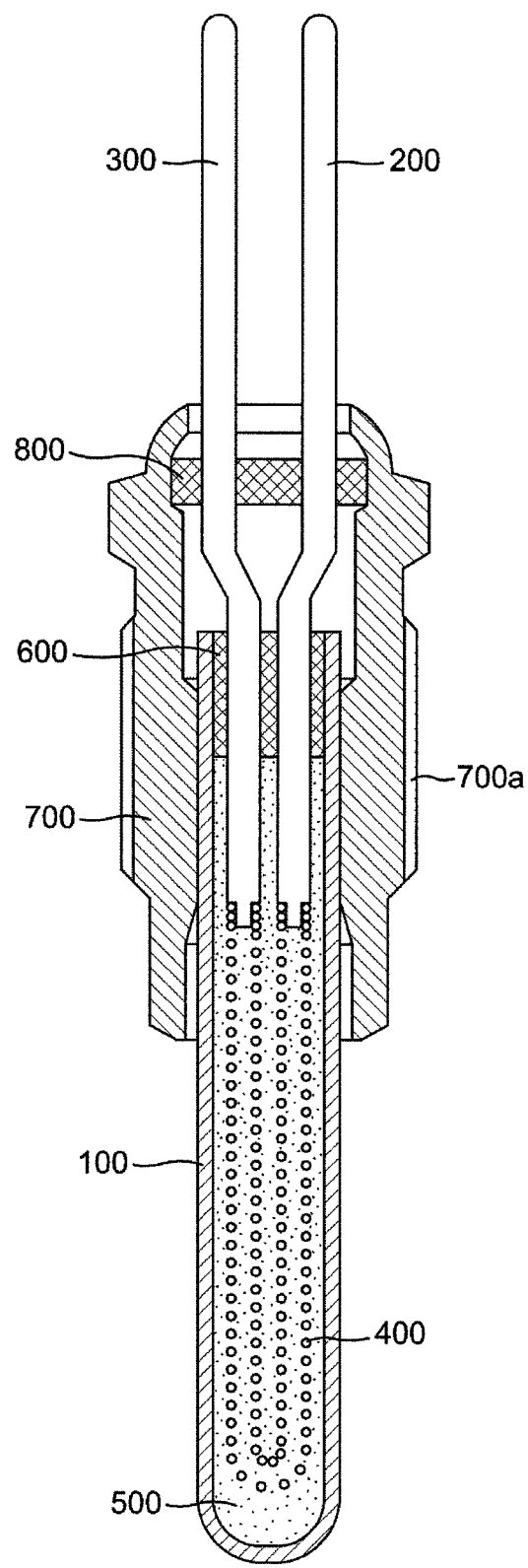
FIG. 3 is a sectional view showing a structure of a heater for an electronic thermostat according to a second embodiment of the present invention.
Figure 4:
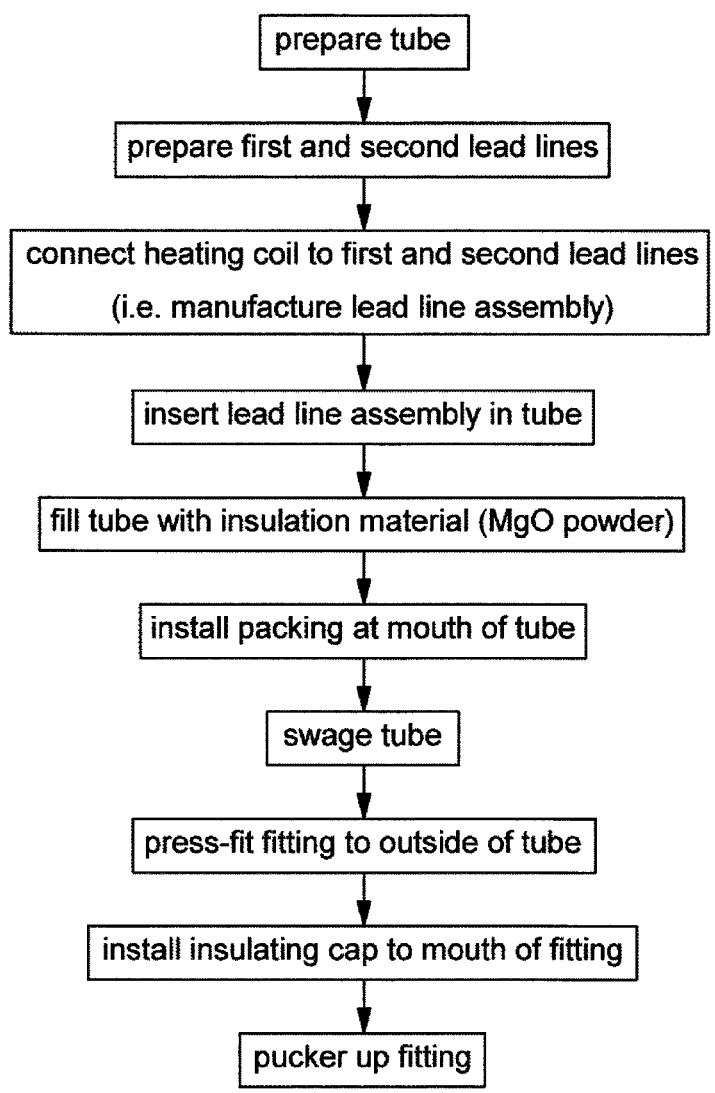
FIG. 4 is a flowchart showing processes of manufacturing the heater for the electronic thermostat of FIG. 3.

FIG. 3 is a sectional view showing a structure of a heater for an electronic thermostat according to a second embodiment of the present invention, FIG. 4 is a flowchart showing processes of manufacturing the heater for the electronic thermostat of FIG. 3, and FIG. 10 is a front view of the heating coil of FIG. 3.

Referring to FIG. 3 and FIG. 4, the heater for the electronic thermostat according to the second embodiment of the present invention has the same structure and manufacturing process as those of the foregoing heater for the electronic thermostat according to the first embodiment of the present invention, except that a fitting 700 is additionally installed outside the tube 100.

Therefore, only a technical structure and a manufacturing process different from those of the first embodiment will be described avoiding repetitive descriptions.

Referring to FIG. 3, in the heater for the electronic thermostat according to the second embodiment of the present invention, the fitting 700 for screw-coupling the heater for the thermostat to a mounting portion of the wax casing is provided outside the tube 100. To this end, the fitting 700 is formed with a screw thread 700a on the outer circumference thereof, and put on the outside of the tube 100 through press-fitting.

The tube 100 may be swaged to have a desired shape.

Further, a cap 800 is made of an insulating substance and provided in a mouth portion of the fitting 700 so as to close the mouth portion of the fitting 700 while supporting portions of the first lead line 200 and the second lead line 300 exposed to the outside of the tube 100. In addition, an O-ring (not shown) may be provided beneath the cap 800.

Since the cap 800 of the insulating substance is bigger than the packing 600, the first lead line 200 and the second lead line 300 exposed through the packing 600 are configured to pass through the cap 800, being bent in the middle portions thereof and more spaced apart from each other.

Below, processes of manufacturing the heater for the electronic thermostat according to the second embodiment of the present invention will be described with reference to FIGS. 3 and 4.

Some processes of the processes for manufacturing the heater for the electronic thermostat according to the second embodiment of the present invention are the same as those of the first embodiment.

Like the processes of manufacturing the heater for the electronic thermostat according to the first embodiment, the lead line assembly is first formed and then inserted in the tube 100; the tube 100 is filled with the insulation material 500 such as MgO powder by ultrasonic vibrations; and the packing 600 made of the insulating substance is installed at the opened mouth of the tube 100.

In the state that the heater for the electronic thermostat according to the first embodiment is manufactured by such processes, the fitting 700 for screw-coupling the heater for the thermostat according to the second embodiment of the present invention to the mounting portion of the wax casing (not shown) is fastened to the outside of the tube 100 through press-fitting, and the cap 800 made of the insulating substance for supporting the first lead line 200 and the second lead line 300 exposed to the outside of the tube 100 is installed at the mouth of the fitting 700.

The cap 800 is installed by inserting the cap 800 in the mouth of the fitting 700, and then puckering up an upper end portion of the fitting 700.

According to the second embodiment of the present invention, the heater for the electronic thermostat configured and manufactured as described above has effects as follows.

The heater for the electronic thermostat according to this embodiment has a structure and a manufacturing process simpler than those of the existing electronic thermostat, so that work efficiency can be improved and production costs can be reduced even though the fitting is provided for fastening the heater to the mounting portion.

In particular, the heater for the electronic thermostat according to this embodiment has the structure that the first lead line 200 and the second lead line 300 for supplying electric power are insulated from the tube 100, and therefore foreign materials are not attached to the valve operating portions on the outer wall of the elements on the contrary to the existing heater for the thermostat.

In other words, the existing heater for the thermostat has the structure where the heating coil and the tube are electrically connected, the tube is electrically connected to the fitting, and the fitting is grounded to a chassis, and therefore electrolysis of a coolant including antifreeze and water based on electric conductivity between the fitting and the wax casing makes foreign materials be attached to the valve operating portion and may cause a malfunction of the electronic thermostat.

Accordingly, the heater for the electronic thermostat according to this embodiment has an effect on improving the durability and operation reliability of the electronic thermostat since there is no problem of foreign materials attached to the valve operating portion due to the electrolysis of the coolant.

Further, the heater for the electronic thermostat according to this embodiment employs the 'U'-shaped heating coil 400 for easily connecting the heating coil to the first lead line 200 and the second lead line 300, thereby simplifying the structure and the process of the heater for the thermostat, improving workability and productivity for mass production when manufactured and assembled, and reducing production costs.

Embodiment 3

Figure 5:
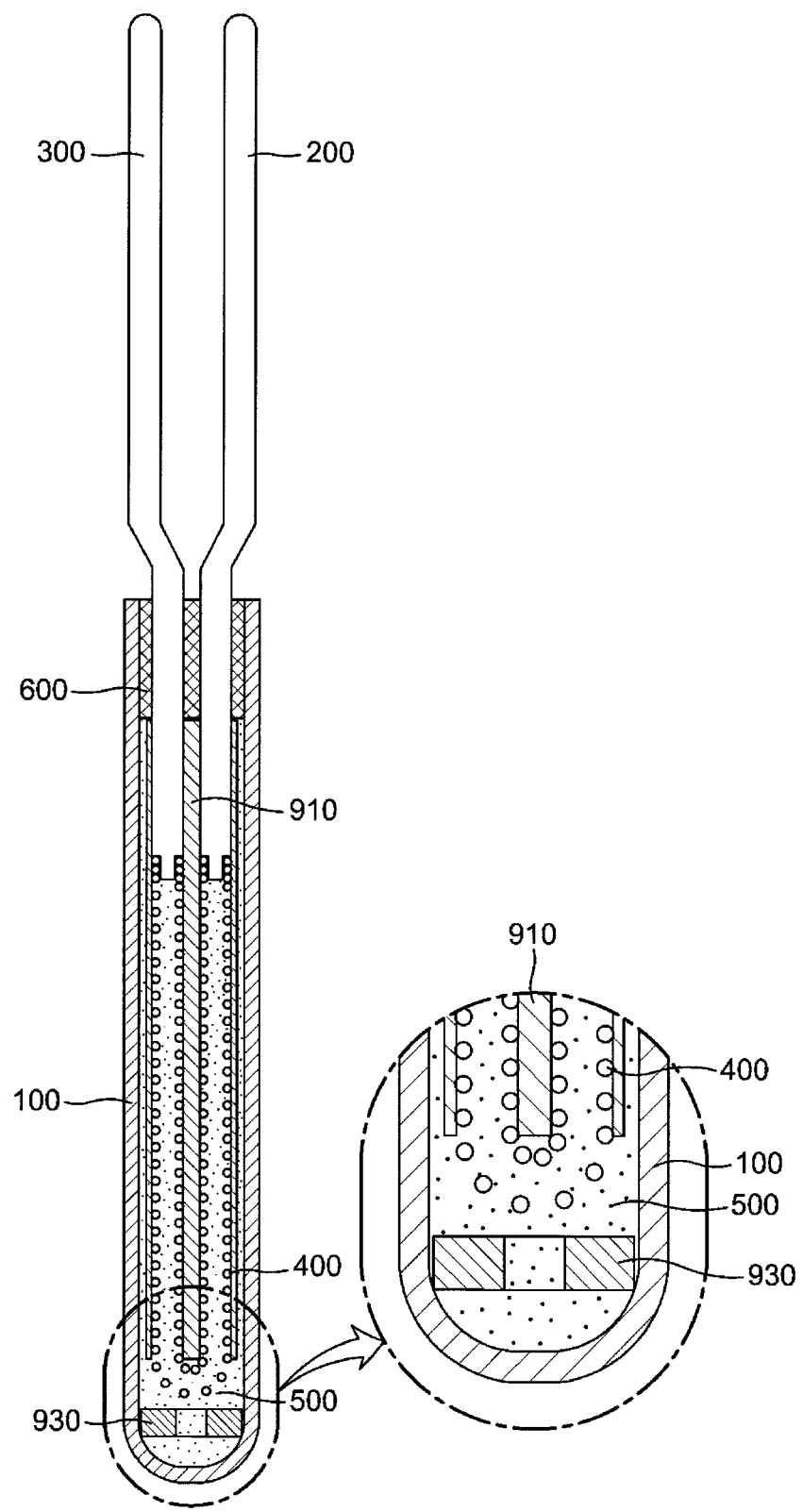
FIG. 5 is a sectional view showing a structure of a heater for an electronic thermostat according to a third embodiment of the present invention.
Figure 6:
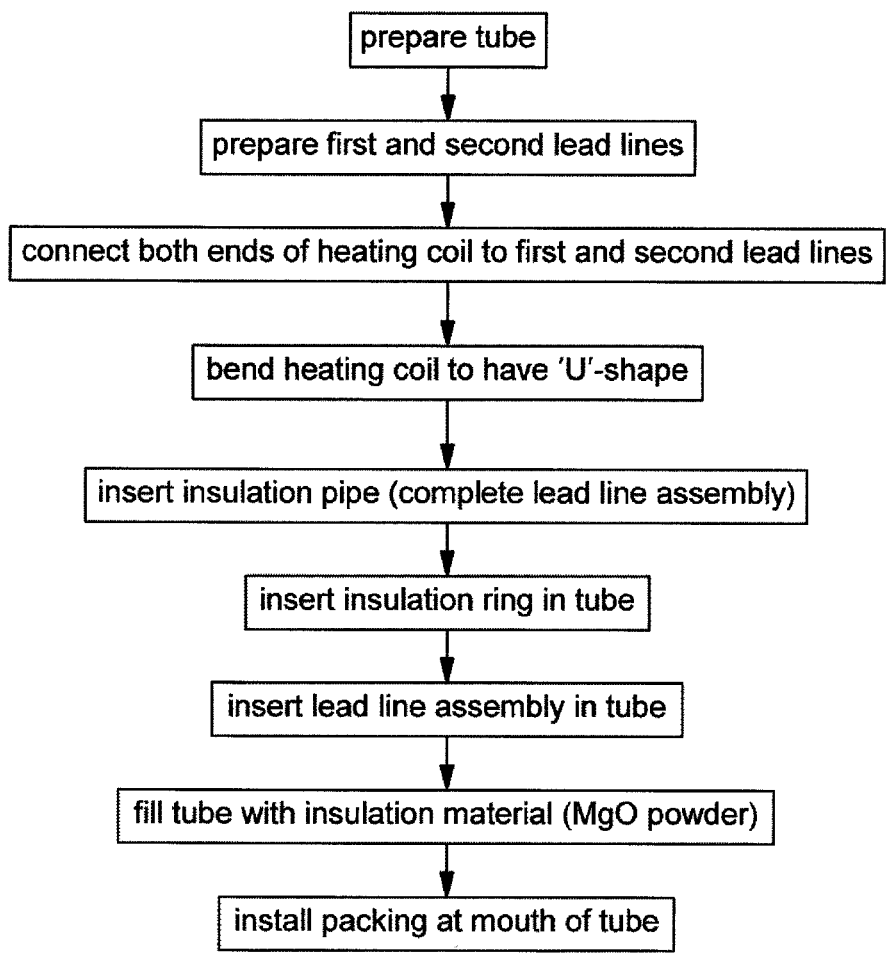
FIG. 6 is a flowchart showing processes of manufacturing the heater for the electronic thermostat of FIG. 5.

FIG. 5 is a sectional view showing a structure of a heater for an electronic thermostat according to a third embodiment of the present invention, FIG. 6 is a flowchart showing processes of manufacturing the heater for the electronic thermostat of FIG. 5, and FIG. 10 is a front view of the heating coil of FIG. 5.

Referring to FIG. 5 and FIG. 6, the heater for the electronic thermostat according to the third embodiment of the present invention has the same structure and manufacturing process as those of the foregoing heater for the electronic thermostat according to the first embodiment of the present invention, except that an additional element is provided for reinforcing the insulation between the 'U'-shaped heating coil 400 and the tube 100, between the first lead line 200 and the second lead line 300 and between the like parts.

Therefore, only a technical structure and a manufacturing process different from those of the first embodiment will be described avoiding repetitive descriptions.

First, the heater for the electronic thermostat according to this embodiment distinctively includes an insulation ring 930 to secure the insulation between the heating coil and the tube 100 under the 'U'-shaped heating coil 400 placed inside the tube 100 (i.e. under the curved portion).

The insulation ring 930 has a through hole at the center thereof, and the through hole has a diameter smaller than the width of the heating coil 400 so that the heating coil 400 cannot enter the insulation ring 930.

Further, an insulation pipe 910 passes through the packing 600 for the first lead line 200 and the second lead line 300 and is inserted in the tube so as to secure the insulation between the first lead line 200 and the second lead line 300, between the tube 100 and the first lead line 200, and between the tube 100 and the second lead line 300.

The insulation pipe 910 has a structure of a tube internally formed with through holes at left and right sides to respectively insert the first lead line 200 and the second lead line 300 therein.

Referring to FIG. 5, the insulation pipe 910 may be extended up to a position for covering not only the first lead line 200 and the second lead line 300 but also the left and right coil portions of the 'U'-shaped heating coil 400.

Below, processes of manufacturing the heater for the electronic thermostat according to the third embodiment of the present invention will be described with reference to FIGS. 5 and 6.

Like the processes of manufacturing the heater for the electronic thermostat according to the first embodiment, the lead line assembly is first formed and then inserted in the tube 100; the tube 100 is filled with the insulation material 500 such as MgO powder by ultrasonic vibrations; and the packing 600 made of the insulating substance is installed at the opened mouth of the tube 100.

In these processes, the insulation pipe 910 shaped like a pipe and the insulation ring 930 having an annular shape are distinctively provided to secure the insulation among the first lead line 200, the second lead line 300, the heating coil 400, the tube 100 and the like elements.

That is, the heater for the electronic thermostat according to this embodiment basically manufactured by the same processes as those for manufacturing the foregoing heater according to the first embodiment, except that the insulation pipe 910 is put on the first lead line 200 and the second lead line 300, and the heating coil 400, and the insulation ring 930 is inserted in the tube 100 before the lead line assembly with the insulation pipe 910 is inserted in the tube 100.

Specifically, the processes of manufacturing the lead line assembly according to this embodiment includes inserting the first lead line 200 and the second lead line 300 in both ends of the straight heating coil 400 in the state that the first lead line 200 and the second lead line 200 are maintained in the form of a straight line (i.e. before the lead line is bent as shown in FIG. 5 the lead line), welding the inserted connection portion by electric resistance welding or laser welding, bending the straight heating coil to have the 'U'-shape, and putting the insulation pipe 910 on the ends of the first lead line 200 and the second lead line 300 opposite to the portions connecting with the heating coil.

According to the third embodiment of the present invention, the heater for the electronic thermostat configured and manufactured as described above has effects as follows.

On the contrary to a conventional heater, the heater for the electronic thermostat according to this embodiment includes no fitting for fastening the heater to the heater mounting portion, thereby simplifying the structure and the process, improving productivity and reducing production costs.

That is, it is possible to effectively reduce an outer diameter since the heater for the electronic thermostat according to this embodiment of the present invention does not need a fitting for mounting the heater to the heater mounting portion, and it is also possible to decrease the number of parts and an assembling efficiency since the insulation body, the O-ring and the annular nut are not needed due to the elimination of the fitting.

The heater for the electronic thermostat according to this embodiment has a structure where the first lead line 200 and the second lead line 300 for supplying the electric power are insulated from the tube 100, and therefore foreign materials are prevented from being attached to a valve operating portion on outer walls of parts on the contrary to the existing heater for the thermostat.

In other words, the existing heater for the thermostat has the structure where the heating coil and the tube are electrically connected, the tube is electrically connected to the fitting, and the fitting is grounded to a chassis, and therefore electrolysis of a coolant including antifreeze and water based on electric conductivity between the fitting and the wax casing makes foreign materials be attached to the valve operating portion and may cause a malfunction of the electronic thermostat. On the other hand, the heater for the thermostat according to this embodiment of the preset invention fundamentally prevents the electrolysis of the coolant since the tube 100 and the heating coil 400 are stably insulated from each other and the first lead line 200 and the second lead line 300 are stably insulated from the tube 100.

Accordingly, the heater for the electronic thermostat according to this embodiment has an effect on improving the durability and operation reliability of the electronic thermostat since there is no problem of foreign materials attached to the valve operating portion due to the electrolysis of the coolant.

Further, the heater for the electronic thermostat according to this embodiment is improved in the insulation between the parts of the heater by the insulation pipe 910 and the insulation ring 930.

Embodiment 4

Figure 7:
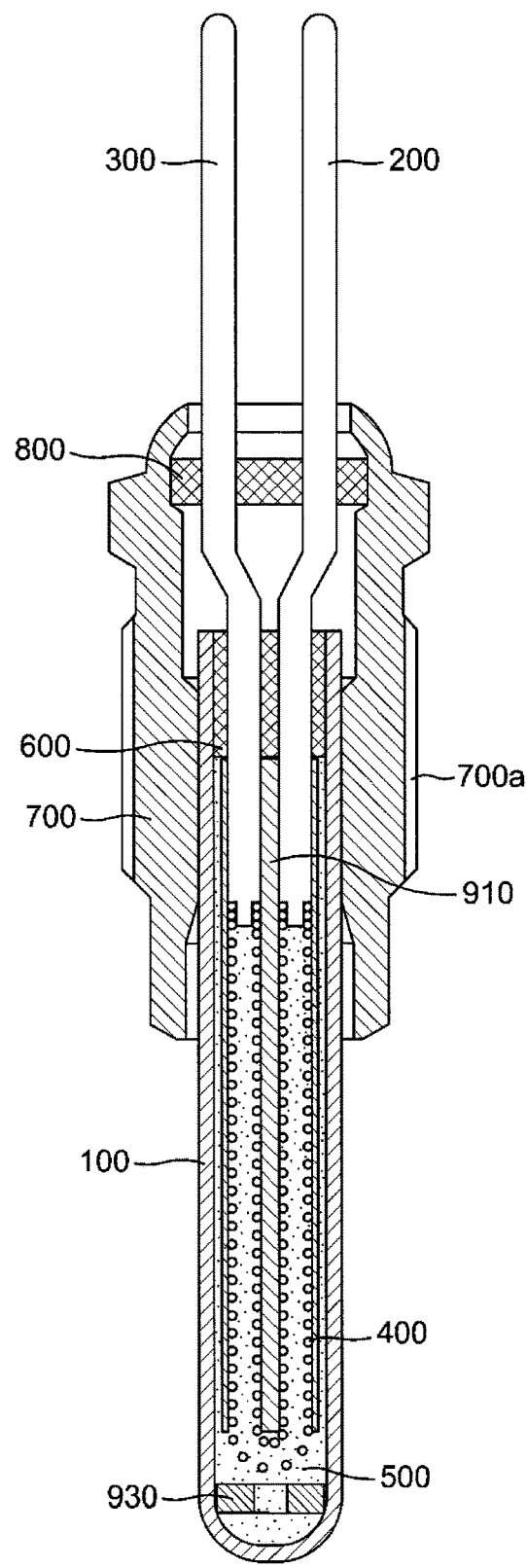
FIG. 7 is a sectional view showing a structure of a heater for an electronic thermostat according to a fourth embodiment of the present invention.
Figure 8:
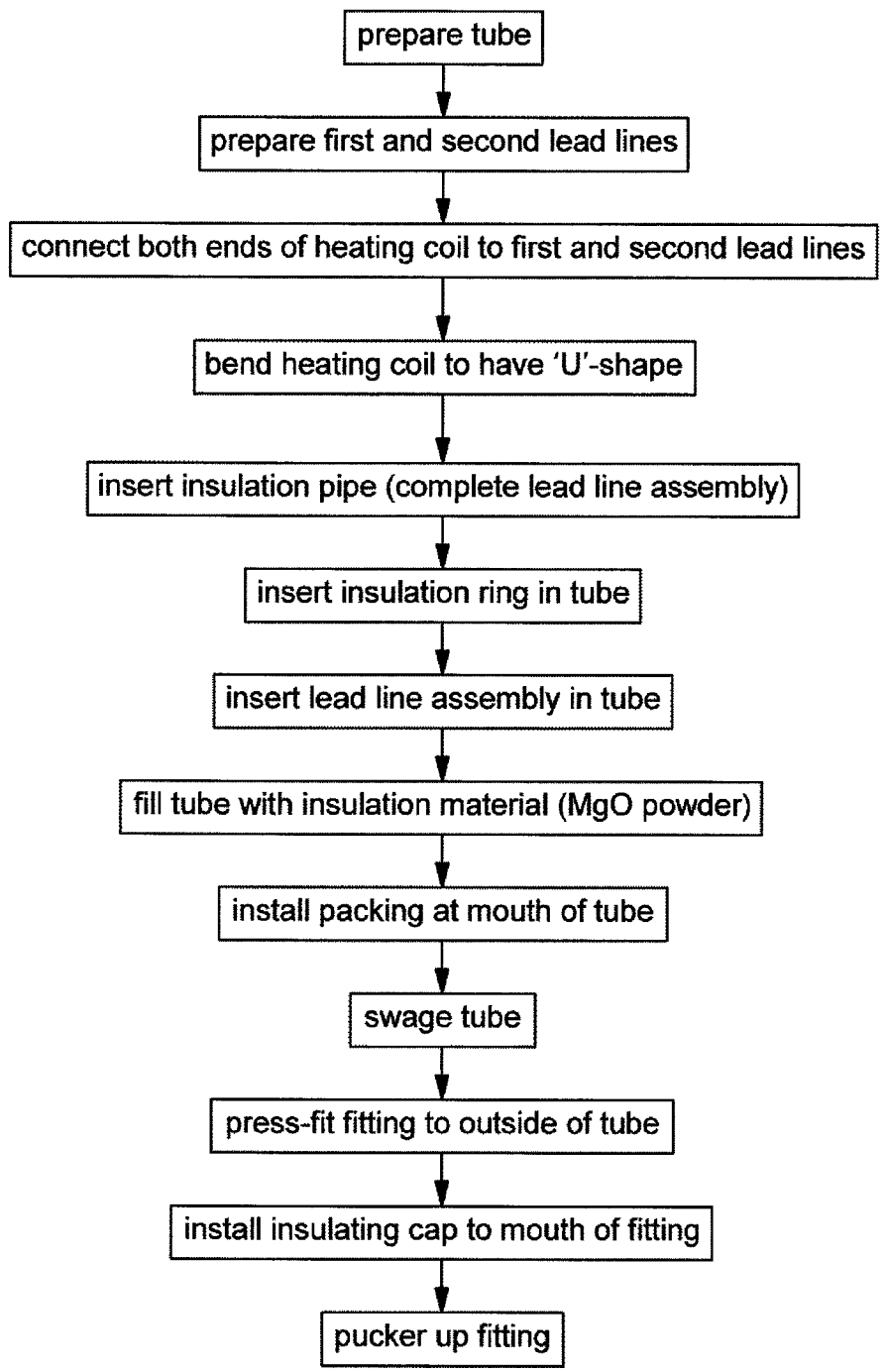
FIG. 8 is a flowchart showing processes of manufacturing the heater for the electronic thermostat of FIG. 7.

FIG. 7 is a sectional view showing a structure of a heater for an electronic thermostat according to a fourth embodiment of the present invention, FIG. 8 is a flowchart showing processes of manufacturing the heater for the electronic thermostat of FIG. 7, and FIG. 10 is a front view of the heating coil of FIG. 7.

Referring to FIG. 7 and FIG. 8, the heater for the electronic thermostat according to the fourth embodiment of the present invention has the same structure and manufacturing process as those of the foregoing heater for the electronic thermostat according to the third embodiment of the present invention, except that the fitting 700 is additionally provided outside the tube 100.

Therefore, only a technical structure and a manufacturing process different from those of the third embodiment will be described avoiding repetitive descriptions.

Referring to FIG. 7, in the heater for the electronic thermostat according to the third embodiment of the present invention, the fitting 700 for screw-coupling the heater for the thermostat to a mounting portion (e.g., the wax casing) is provided outside the tube 100. That is, the fitting 700 is formed with a screw thread 700*a* on the outer circumference thereof, and put on the outside of the tube 100 through press-fitting.

The tube 100 may be swaged to have a desired shape. Further, a cap 800 is made of an insulating substance and provided in a mouth portion of the fitting 700 so as to close the mouth portion of the fitting 700 while supporting portions of the first lead line 200 and the second lead line 300 exposed to the outside of the tube 100. In addition, an O-ring (not shown) may be provided beneath the cap 800.

Below, processes of manufacturing the heater for the electronic thermostat according to the fourth embodiment of the present invention will be described with reference to FIGS. 7 and 8.

As mentioned above, to avoid repetitive descriptions, descriptions about the same manufacturing processes as those of the third embodiment will be omitted, and difference from the third embodiment will be mainly described.

Like the processes of manufacturing the heater for the electronic thermostat according to the third embodiment, the lead line assembly is first formed and then inserted in the tube 100; the tube 100 is filled with the insulation material 500 such as MgO powder by ultrasonic vibrations; and the packing 600 made of the insulating substance is installed at the opened mouth of the tube 100.

During the manufacturing processes, the insulation pipe 910 is put on the first lead line 200 and the second lead line 300, and the insulation ring 930 is inserted in a lower side inside the tube 100.

After the heater for the electronic thermostat with the structure proposed in the third embodiment is manufactured through the foregoing processes, the additional manufacturing processes in this embodiment is performed as follows: the fitting 700 for screw-coupling the heater for the thermostat to the heater mounting portion (e.g., the wax casing) is fastened to the outside of the tube 100 through the press-fitting, and the cap 800 made of an insulating substance is installed in the mouth of the fitting 700 in order to support the first lead line 200 and the second lead line 300 exposed outside the tube 100

According to the fourth embodiment of the present invention, the heater for the electronic thermostat configured and manufactured as described above has effects as follows.

The heater for the electronic thermostat according to this embodiment has a simple structure and a simple manufacturing process and is manufactured by low production costs as compared with the existing electronic thermostat, even though the fitting 700 is provided.

In particular, in the heater for the electronic thermostat according to this embodiment, the insulation is sufficiently secured among parts placed inside the tube 100 (i.e. the tube, the heating coil, the first lead line, and the second lead line), thereby improving the durability and reliability of the heater.

The heater for the electronic thermostat according to this embodiment has a structure where the first lead line 200 and the second lead line 300 for supplying the electric power are insulated from the tube 100, and therefore foreign materials are prevented from being attached to a valve operating portion on outer walls of parts on the contrary to the existing heater for the thermostat.

In other words, the existing heater for the thermostat has the structure where the heating coil and the tube are electrically connected, the tube is electrically connected to the fitting, and the fitting is grounded to a chassis, and therefore electrolysis of a coolant including antifreeze and water based on electric conductivity between the fitting and the wax casing makes foreign materials be attached to the valve operating portion and may cause a malfunction of the electronic thermostat. On the other hand, the heater for the thermostat according to the first to fourth embodiments of the preset invention fundamentally prevents the electrolysis of the coolant since the tube 100 and the heating coil 400 are stably insulated from each other and the first lead line 200 and the second lead line 300 are stably insulated from the tube 100.

Accordingly, the heater for the electronic thermostat according to this embodiment has an effect on improving the durability and operation reliability of the electronic thermostat since there is no problem of foreign materials attached to the valve operating portion due to the electrolysis of the coolant.

Further, the heater for the electronic thermostat according to this embodiment is improved in the insulation between the parts of the heater by the insulation pipe 910 and the insulation ring 930.

Embodiment 5

Figure 9:
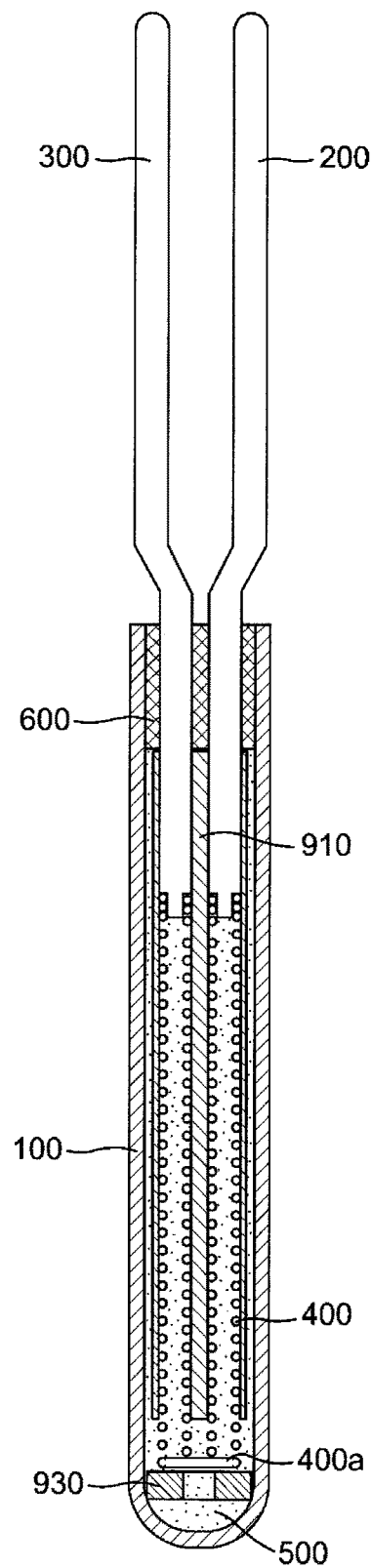
FIG. 9 is a sectional view showing a structure of a heater for an electronic thermostat according to a fifth embodiment of the present invention.
Figure 11:
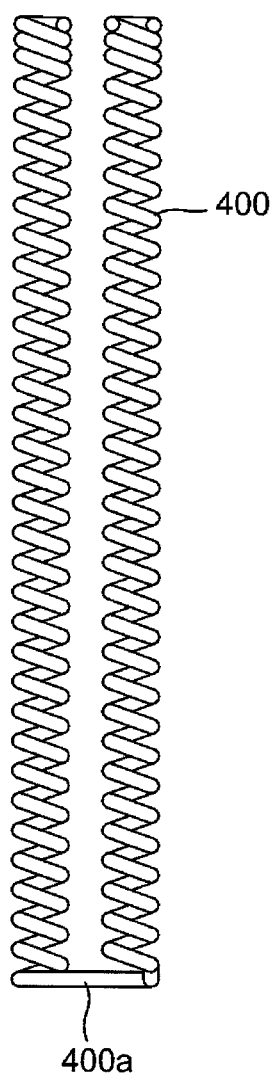
FIG. 11 is a front view of a heating coil applied to the fifth embodiment of the present invention.

FIG. 9 is a sectional view showing a structure of a heater for an electronic thermostat according to a fifth embodiment of the present invention, and FIG. 11 is a front view of a heating coil applied to the fifth embodiment of the present invention.

Referring to FIG. 9 and FIG. 11, the heater for the electronic thermostat according to the fifth embodiment of the present invention has the same structure and manufacturing process as those of the foregoing heater for the electronic thermostat according to the third embodiment of the present invention, except that the 'U'-shaped heating coil has a different structure.

Therefore, only a technical structure and a manufacturing process different from those of the third embodiment will be described avoiding repetitive descriptions.

In the heater for the electronic thermostat according to this embodiment, the 'U'-shaped heating coil 400 is different in a winding connection structure at a lower side from that of the third embodiment. That is, the heating coil 400 in this embodiment has the 'U'-shape formed by not forcibly bending the winding portion of the straight coil spring (refer to the heating coils of the first to fourth embodiments), but using a straight connecting portion 400*a* to connect left and right winding portions of the coil spring without a separate bending process.

On the contrary to the heating coils according to the first to fourth embodiments, the 'U'-shaped heating coil 400 with this configuration according to this embodiment has no change in resistance due to a dense winding portion at a lower side of the coil, and thus stably maintains the electric characteristics of the heating coil.

Accordingly, the heating coil 400 in this embodiment is applicable instead of the heating coil for the heater for the electronic thermostat according to the first, second and fourth embodiments as well as the heating coil according to the third embodiment.

Embodiment 6

Figure 12:
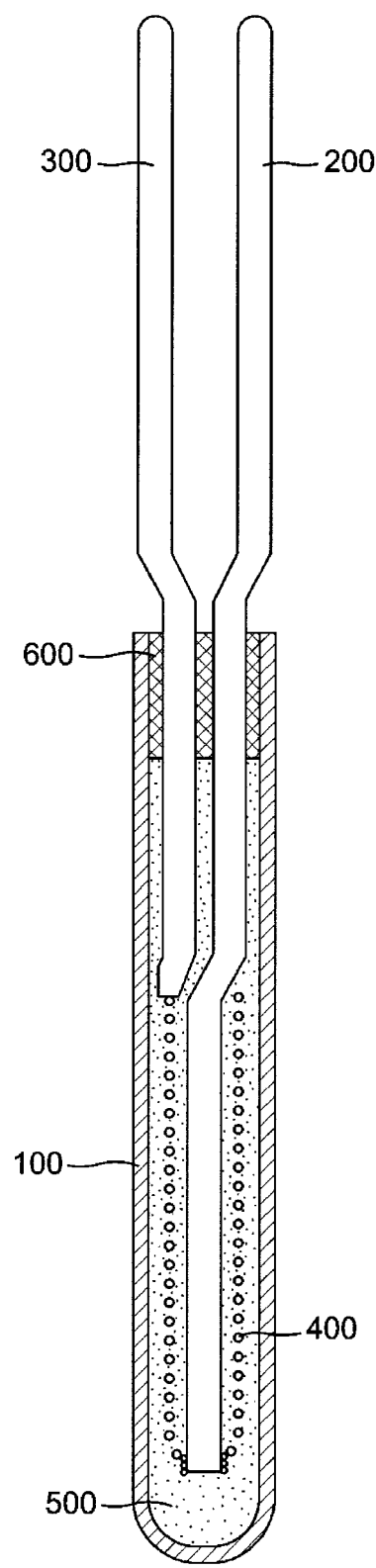
FIG. 12 is a sectional view showing a structure of a heater for an electronic thermostat according to a sixth embodiment of the present invention.
Figure 13:
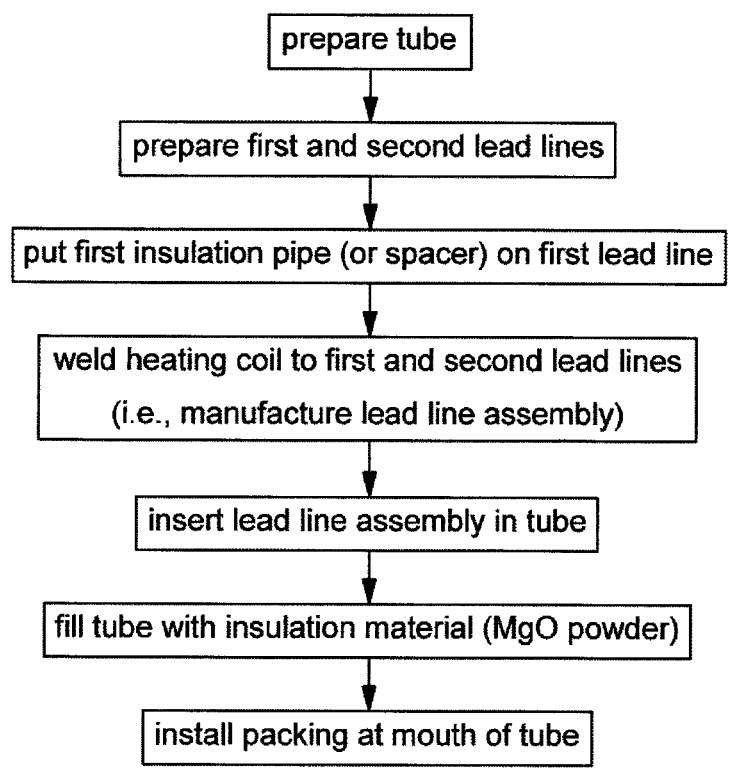
FIG. 13 is a flowchart showing processes of manufacturing the heater for the electronic thermostat of FIG. 12.

FIG. 12 is a sectional view showing a structure of a heater for an electronic thermostat according to a sixth embodiment of the present invention, and FIG. 13 is a flowchart showing processes of manufacturing the heater for the electronic thermostat of FIG. 12.

Referring to FIG. 12, the heater for the electronic thermostat according to the sixth embodiment of the present invention includes a tube 100 having a hollow structure of which one side is opened and the other side is closed; a first lead line 200 having a first end portion exposed to an outside of the tube 100 and a second end portion placed inside the tube 100 and receiving electric power from an exterior through the first end portion exposed to the outside of the tube 100; a second lead line 300 having a first end portion exposed to the outside of the tube 100 and a second end portion placed inside the tube 100 and spaced apart from the first lead line 200; a heating element electrically connecting the first lead line 200 and the second lead line 300 and generating heat based on electrical resistance; an insulation material 500 filled in an inner space of the tube 100; and a packing 600 installed inside a mouth of the tube 100 and made of an insulating substance serving as a support for supporting and maintaining the first lead line 200 and the second lead line 300 to be spaced apart from each other Here, the second lead line 300 positioned inside the tube 100 is configured to shorter than the first lead line 200.

The heating element is the heating coil 400 that has a first end connected to a front end portion of the first lead line 200 inside the tube 100, and a second end connected to a front end portion of the second lead line 300 inside the tube 100, and is spaced apart from the first lead line 200 while surrounding the first lead line 200.

The connection between the first end of the heating coil 400 and the front end portion of the first lead line 200 inside the tube 100, and the connection between the second end of the heating coil 400 and the front end portion of the second lead line 300 inside the tube 100 are achieved by electric resistance welding or laser welding.

Substantially, the first end of the heating coil 400 is welded to the front end portion of the first lead line 200. To this end, the first end of the heating coil 400 is tapered. Further, the insulation material 500 filled in the tube 100 may include magnesium oxide (MgO) powder, but not limited thereto.

The first lead line 200 and the second lead line 300 penetrate the packing 600 at the mouth of the tube 100, being bilaterally symmetrical with respect to a central axis along a lengthwise direction of the tube 100.

In addition, the first lead line 200 surrounded with the heating coil 400 is bent to be aligned with a central axis of the tube 100 along the lengthwise direction.

Below, processes of manufacturing the foregoing heater for the electronic thermostat according to this embodiment of the present invention will be described with reference to FIGS. 12 and 13.

First, the tube 100 having the hollow structure, of which one side is opened and the other side is closed, is prepared. Then, the first lead line and the second lead line 300 to be inserted in the tube 100 are prepared.

In the state that the heating coil 400 is put on the first lead line 200 and surrounds the first lead line 200, the first end of the heating coil 400 and the first lead line 200 are coupled, and the second end of the heating coil 400 and the second lead line 300 are coupled, thereby forming a lead line assembly.

The connection between the first end of the heating coil 400 and the front end portion of the first lead line 200 inside the tube 100, and the connection between the second end of the heating coil 400 and the front end portion of the second lead line 300 inside the tube 100 are achieved by electric resistance welding or laser welding.

Next, the assembly of the first lead line 200 and the second lead line 300 welded to the heating coil 400 (i.e. the lead line assembly) are inserted in the tube 100. Subsequently, the tube 100 is filled with the insulation material 500 such as MgO powder by ultrasonic vibrations. Then, the packing 600 made of the insulating substance is installed at the opened mouth of the tube 100.

Through the foregoing processes, the heater for the electronic thermostat according to the sixth embodiment of the present invention is manufactured, and the heater for the electronic thermostat with the foregoing configuration according to this embodiment of the present invention uses a portion of the tube 100 as the thermostat and is fixed to a wax casing (not shown) internally filled with wax.

According to the sixth embodiment of the present invention, the heater for the electronic thermostat configured and manufactured as described above has effects as follows.

On the contrary to a conventional heater, there is no need of a fitting for fastening the heater to a heater mounting portion, so that the structure and the process can be simplified, and production costs can be reduced.

That is, it is possible to effectively reduce an outer diameter since the heater for the electronic thermostat according to the sixth embodiment of the present invention does not need a fitting for mounting the heater to the heater mounting portion (e.g., the wax casing) through screw fastening, and it is also possible to decrease the number of parts and an assembling efficiency since the insulation body, the O-ring and the annular nut are not needed due to the elimination of the fitting.

The heater for the electronic thermostat according to this embodiment has a structure where the first lead line 200 and the second lead line 300 for supplying the electric power are insulated from the tube 100, and therefore foreign materials are prevented from being attached to a valve operating portion on outer walls of parts on the contrary to the existing heater for the thermostat.

In other words, the existing heater for the thermostat has the structure where the heating coil and the tube are electrically connected, the tube is electrically connected to the fitting, and the fitting is grounded to a chassis, and therefore electrolysis of a coolant including antifreeze and water based on electric conductivity between the fitting and the wax casing makes foreign materials be attached to the valve operating portion and may cause a malfunction of the electronic thermostat. On the other hand, the heater for the thermostat according to this embodiment of the preset invention fundamentally prevents the electrolysis of the coolant since the tube 100 and the heating coil 400 are insulated from each other.

Accordingly, the heater for the electronic thermostat according to this embodiment has an effect on improving the durability and operation reliability of the electronic thermostat since there is no problem of foreign materials attached to the valve operating portion due to the electrolysis of the coolant.

Embodiment 7

Figure 14:
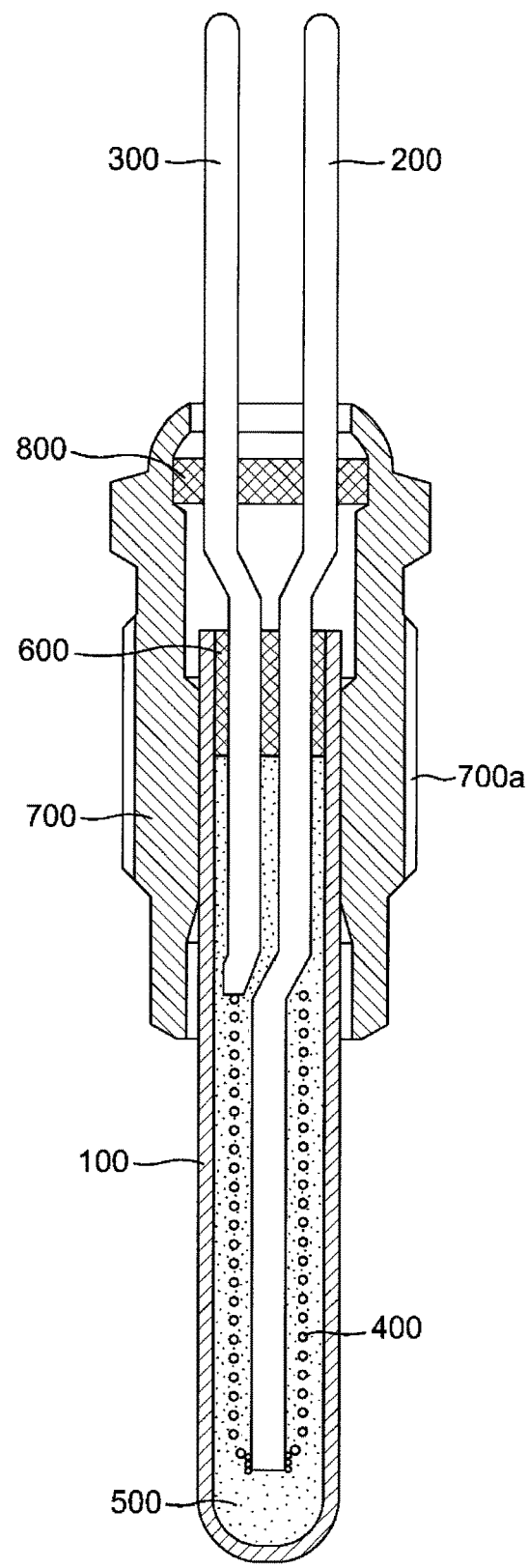
FIG. 14 is a sectional view showing a structure of a heater for an electronic thermostat according to a seventh embodiment of the present invention.
Figure 15:
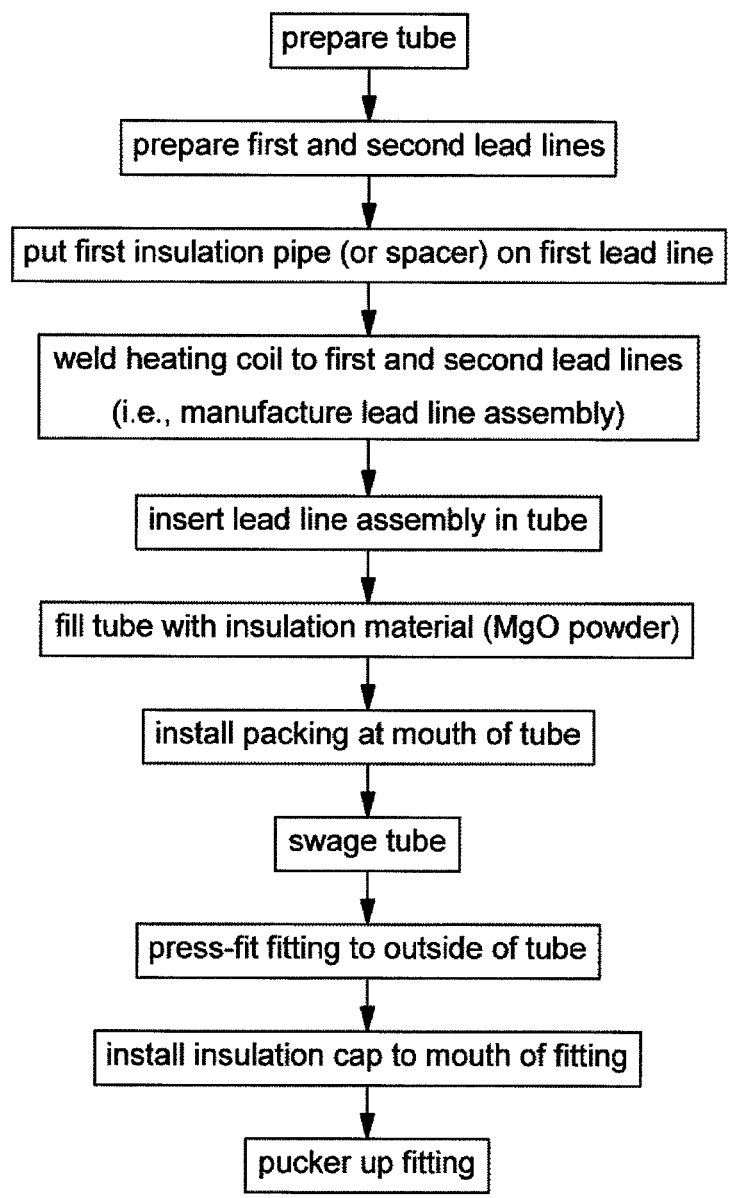
FIG. 15 is a flowchart showing processes of manufacturing the heater for the electronic thermostat of FIG. 14.

FIG. 14 is a sectional view showing a structure of a heater for an electronic thermostat according to a seventh embodiment of the present invention, and FIG. 15 is a flowchart showing processes of manufacturing the heater for the electronic thermostat of FIG. 14.

Referring to FIG. 14 and FIG. 15, the heater for the electronic thermostat according to the seventh embodiment of the present invention has the same structure and manufacturing process as those of the foregoing heater for the electronic thermostat according to the sixth embodiment of the present invention, except that the fitting 700 is additionally provided outside the tube 100.

Therefore, only a technical structure and a manufacturing process different from those of the sixth embodiment will be described avoiding repetitive descriptions.

Referring to FIG. 14, in the heater for the electronic thermostat according to the second embodiment of the present invention, the fitting 700 for screw-coupling the heater for the thermostat to a mounting portion of the wax casing is provided outside the tube 100. To this end, the fitting 700 is formed with a screw thread 700a on the outer circumference thereof, and put on the outside of the tube 100 through press-fitting.

The tube 100 may be swaged to have a desired shape.

Further, a cap 800 is made of an insulating substance and provided in a mouth portion of the fitting 700 so as to close the mouth portion of the fitting 700 while supporting portions of the first lead line 200 and the second lead line 300 exposed to the outside of the tube 100. In addition, an O-ring (not shown) may be provided beneath the cap 800.

Since the cap 800 of the insulating substance is bigger than the packing 600, the first lead line 200 and the second lead line 300 exposed through the packing 600 are configured to pass through the cap 800, being bent in the middle portions thereof and more spaced apart from each other.

Below, processes of manufacturing the heater for the electronic thermostat according to the seventh embodiment of the present invention will be described with reference to FIGS. 14 and 15.

To avoid repetitive descriptions, descriptions about the same manufacturing processes as those of the sixth embodiment will be omitted, and difference from the sixth embodiment will be mainly described.

Like the processes of manufacturing the heater for the electronic thermostat according to the sixth embodiment, the lead line assembly is first formed and then inserted in the tube 100; the tube 100 is filled with the insulation material 500 such as MgO powder by ultrasonic vibrations; and the packing 600 made of the insulating substance is installed at the opened mouth of the tube 100.

In the state that the heater for the electronic thermostat according to the sixth embodiment is manufactured by such processes, the fitting 700 for screw-coupling the heater for the thermostat according to this embodiment of the present invention to the mounting portion of the wax casing is fastened to the outside of the tube 100 through press-fitting, and the cap 800 made of the insulating substance for supporting the first lead line 200 and the second lead line 300 exposed to the outside of the tube 100 is installed at the mouth of the fitting 700.

The cap 800 is installed by inserting the cap 800 in the mouth of the fitting 700, and then puckering up an upper end portion of the fitting 700.

According to the seventh embodiment of the present invention, the heater for the electronic thermostat configured and manufactured as described above has effects as follows.

The heater for the electronic thermostat according to this embodiment has a structure and a manufacturing process simpler than those of the existing electronic thermostat, so that work efficiency can be improved and production costs can be reduced even though the fitting is provided for fastening the heater to the mounting portion.

The heater for the electronic thermostat according to this embodiment has a structure where the first lead line 200 and the second lead line 300 for supplying the electric power are insulated from the tube 100, and therefore foreign materials are prevented from being attached to a valve operating portion on outer walls of parts on the contrary to the existing heater for the thermostat.

In other words, the existing heater for the thermostat has the structure where the heating coil and the tube are electrically connected, the tube is electrically connected to the fitting, and the fitting is grounded to a chassis, and therefore electrolysis of a coolant including antifreeze and water based on electric conductivity between the fitting and the wax casing makes foreign materials be attached to the valve operating portion and may cause a malfunction of the electronic thermostat. On the other hand, the heater for the thermostat according to this embodiment of the preset invention fundamentally prevents the electrolysis of the coolant since the tube 100 and the heating coil 400 are insulated from each other.

Accordingly, the heater for the electronic thermostat according to this embodiment has an effect on improving the durability and operation reliability of the electronic thermostat since there is no problem of foreign materials attached to the valve operating portion due to the electrolysis of the coolant.

Embodiment 8

Figure 16:
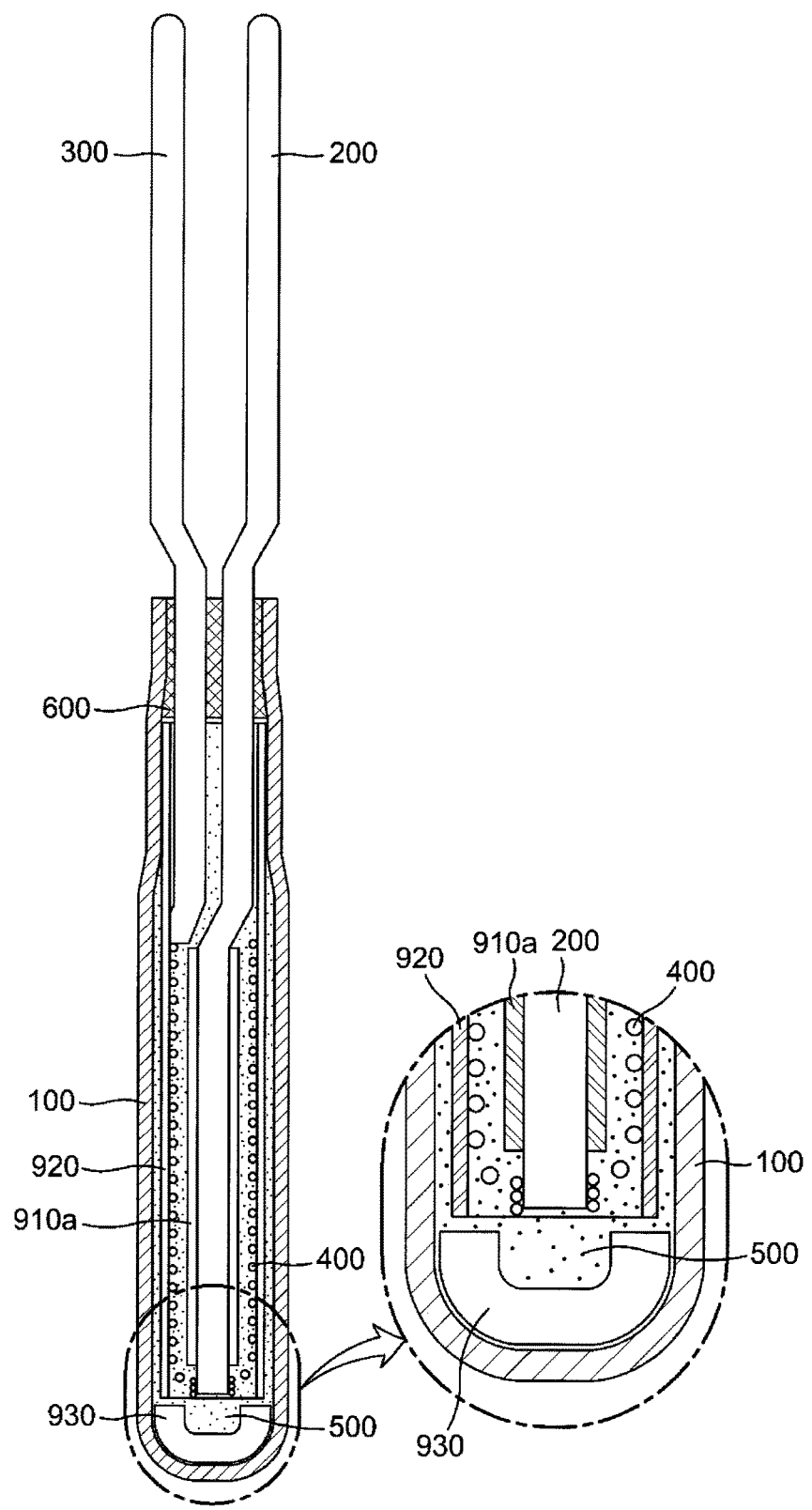
FIG. 16 is a sectional view showing a structure of a heater for an electronic thermostat according to an eighth embodiment of the present invention.
Figure 17:
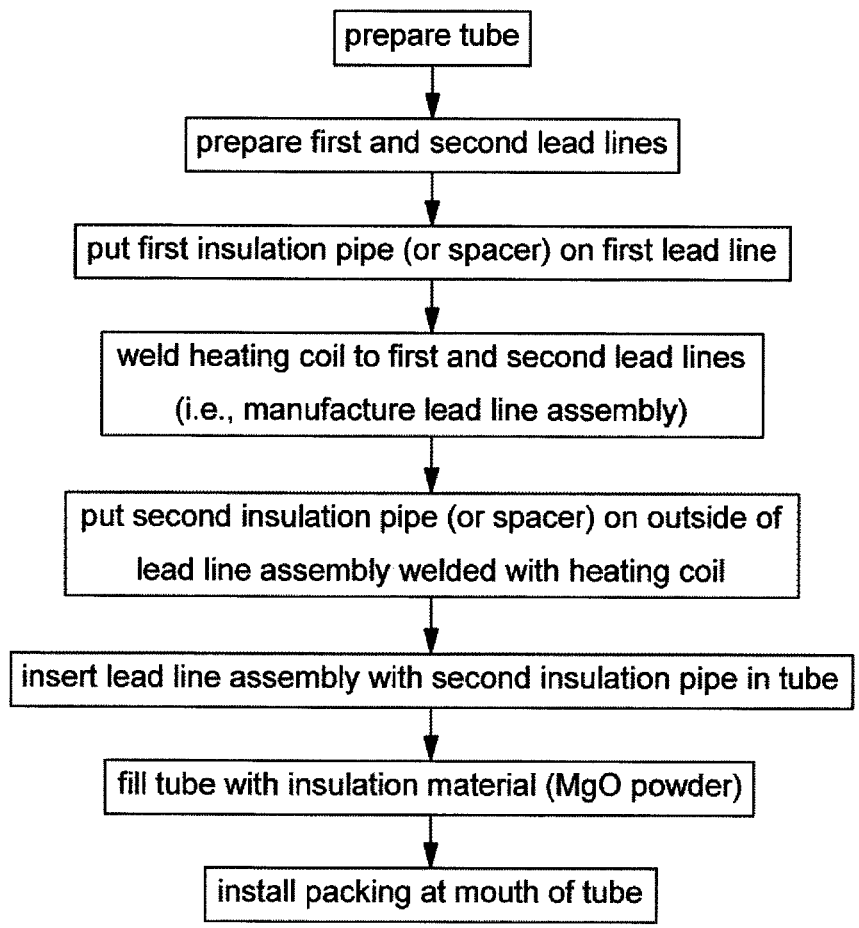
FIG. 17 is a flowchart showing processes of manufacturing the heater for the electronic thermostat of FIG. 16.

FIG. 16 is a sectional view showing a structure of a heater for an electronic thermostat according to an eighth embodiment of the present invention, and FIG. 17 is a flowchart showing processes of manufacturing the heater for the electronic thermostat of FIG. 16.

Referring to FIG. 16 and FIG. 17, the heater for the electronic thermostat according to the eighth embodiment of the present invention has the same structure and manufacturing process as those of the foregoing heater for the electronic thermostat according to the sixth embodiment of the present invention, except that an additional element is provided for reinforcing insulation between the first lead line 200 and the heating coil 400 inside the tube 100, between the first lead line 200 and the second lead line 300, and between the like parts.

Therefore, only a technical structure and a manufacturing process different from those of the sixth embodiment will be described avoiding repetitive descriptions.

First, the heater for the electronic thermostat according to this embodiment includes a first insulation pipe 910a for securing the insulation between a partial region of the first lead line 200 placed inside the tube 100 and the heating coil 400. The first insulation pipe 910a is made of an insulating substance and is put on the outer circumference of the first lead line 200, surrounding the whole outer circumference.

In addition, a second insulation pipe is provided for securing insulation between the tube 100 and the heating coil 400 installed inside the tube 100. Likewise, the second insulation pipe 920 is made of an insulating substance and is extended up to a portion beneath the packing 600 so as to secure the insulation between the tube 100 and the first lead line 200 placed above the heating coil 400 and between the tube 100 and the second lead line 300 placed above the heating coil 400

Further, an insulation ring 930 is provided under the front end portion of the first lead line 200 inside the tube 100 and secure insulation between the front end portion of the first lead line 200 and a lower end portion of the tube 100.

In the first lead line 200 and the second lead line 300 placed inside the tube 100, an insulation member (not shown) may be further provided to secure insulation between the second lead line 300 and a portion of the first lead line 200 not covered with the first insulation pipe 910a.

Below, processes of manufacturing the heater for the electronic thermostat according to the eighth embodiment of the present invention will be described with reference to FIGS. 16 and 17.

To avoid repetitive descriptions, descriptions about the same manufacturing processes as those of the sixth embodiment will be omitted, and difference from the sixth embodiment will be mainly described.

Like the processes of manufacturing the heater for the electronic thermostat according to the sixth embodiment, the lead line assembly is first formed and then inserted in the tube 100; the tube 100 is filled with the insulation material 500 such as MgO powder by ultrasonic vibrations; and the packing 600 made of the insulating substance is installed at the opened mouth of the tube 100.

According to this embodiment, the first insulation pipe 910a and the second insulation pipe 920 shaped like a pipe and the insulation ring 930 shaped like a ring are installed to secure the insulation among the first lead line 200, the second lead line 300 and the tube 100.

That is, the heater for the electronic thermostat according to this embodiment is distinctively manufactured by inserting the first insulation pipe 910a before the heating coil 400 is put on the outer circumference of the first lead line 200 in the foregoing process of manufacturing the heater according to the sixth embodiment; putting the second insulation pipe 920 on the outer circumference of the heating coil 400 of the lead line assembly before the lead line assembly formed by the same processes as those for manufacturing the foregoing heater for the electronic thermostat according to the sixth embodiment is inserted in the tube 100; and inserting the insulating ring 930 in the tube 100 before the lead line assembly covered with the second insulation pipe 920 is inserted in the tube 100.

According to the eighth embodiment of the present invention, the heater for the electronic thermostat configured and manufactured as described above has effects as follows.

On the contrary to a conventional heater, the heater for the electronic thermostat according to this embodiment includes no fitting for fastening the heater to the heater mounting portion, thereby simplifying the structure and the process, improving productivity and reducing production costs.

That is, it is possible to effectively reduce an outer diameter since the heater for the electronic thermostat according to the first embodiment of the present invention does not need a fitting for mounting the heater to the heater mounting portion, and it is also possible to decrease the number of parts and an assembling efficiency since the insulation body, the O-ring and the annular nut are not needed due to the elimination of the fitting.

The heater for the electronic thermostat according to this embodiment has a structure where the first lead line 200 and the second lead line 300 for supplying the electric power are insulated from the tube 100, and therefore foreign materials are prevented from being attached to a valve operating portion on outer walls of parts on the contrary to the existing heater for the thermostat.

In other words, the existing heater for the thermostat has the structure where the heating coil and the tube are electrically connected, the tube is electrically connected to the fitting, and the fitting is grounded to a chassis, and therefore electrolysis of a coolant including antifreeze and water based on electric conductivity between the fitting and the wax casing makes foreign materials be attached to the valve operating portion and may cause a malfunction of the electronic thermostat. On the other hand, the heater for the thermostat according to this embodiment of the preset invention fundamentally prevents the electrolysis of the coolant since the tube 100 and the heating coil 400 are insulated from each other.

Accordingly, the heater for the electronic thermostat according to this embodiment has an effect on improving the durability and operation reliability of the electronic thermostat since there is no problem of foreign materials attached to the valve operating portion due to the electrolysis of the coolant.

Embodiment 9

Figure 18:
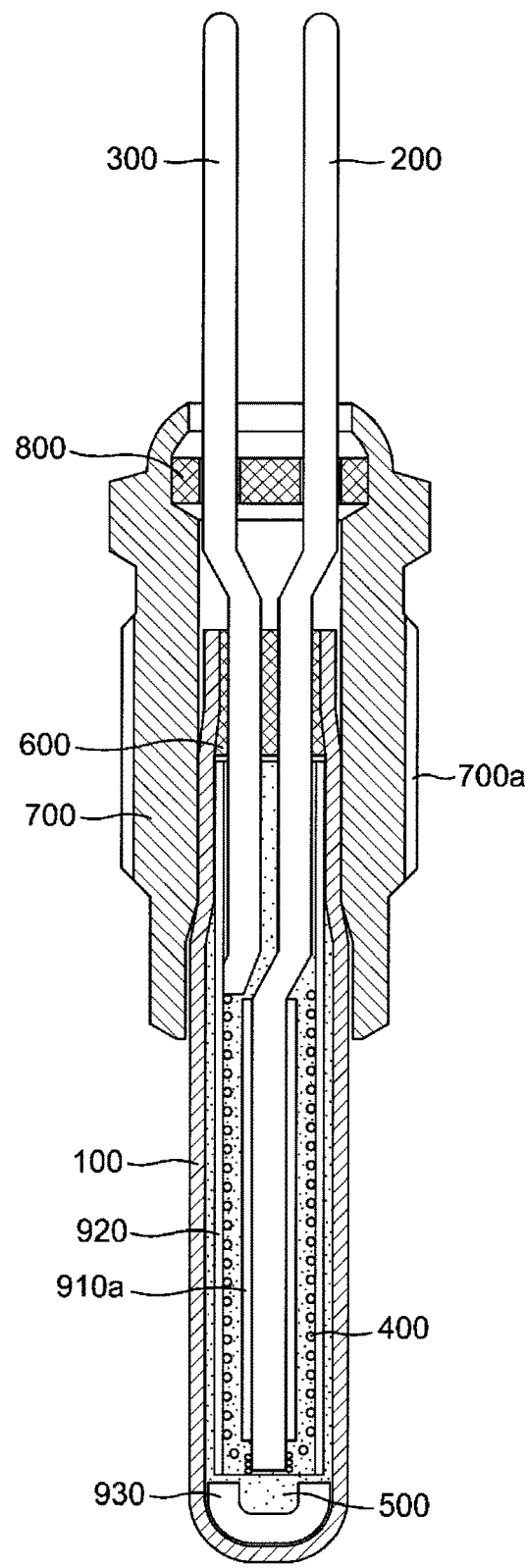
FIG. 18 is a sectional view showing a structure of a heater for an electronic thermostat according to a ninth embodiment of the present invention.
Figure 19:
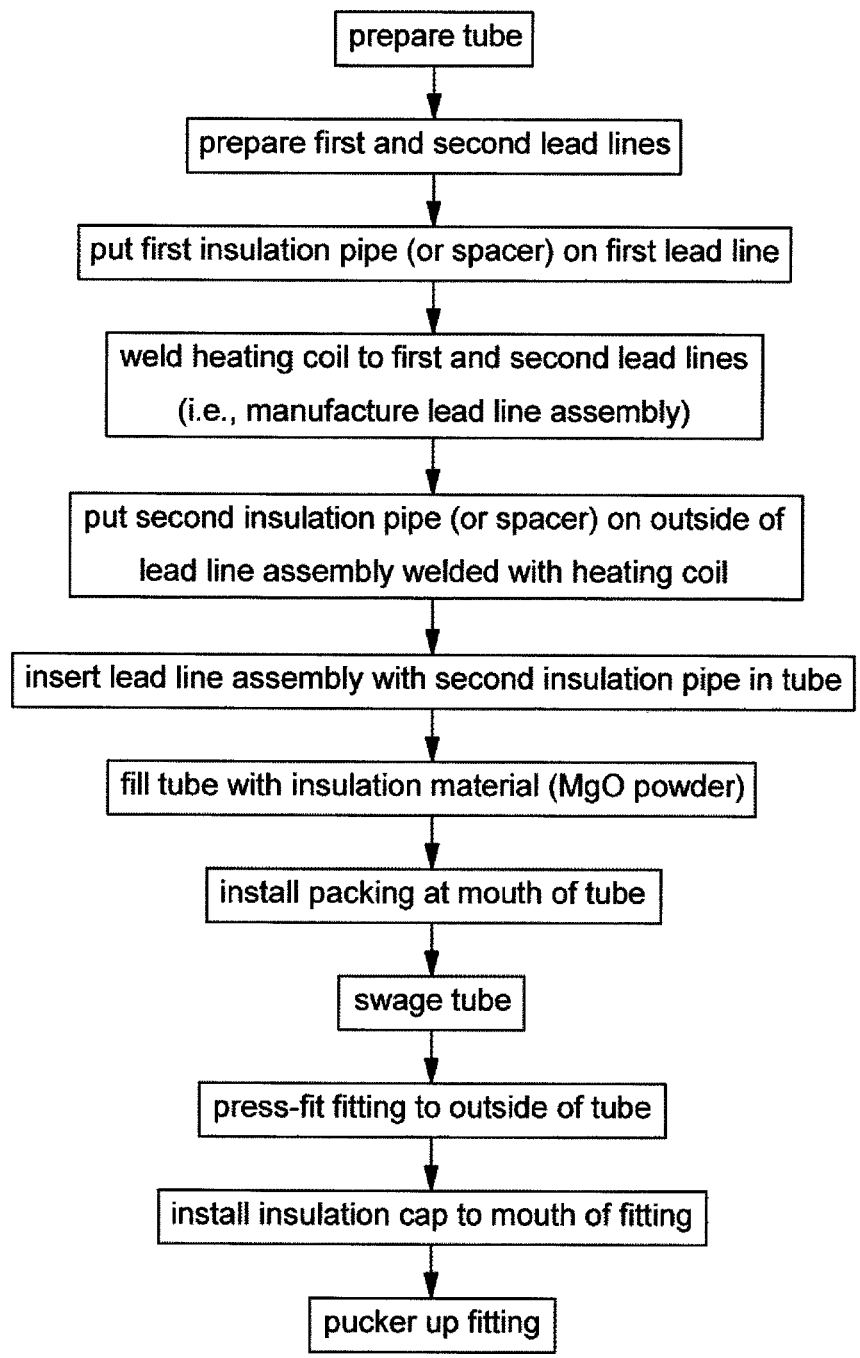
FIG. 19 is a flowchart showing processes of manufacturing the heater for the electronic thermostat of FIG. 18.

FIG. 18 is a sectional view showing a structure of a heater for an electronic thermostat according to a ninth embodiment of the present invention, and FIG. 19 is a flowchart showing processes of manufacturing the heater for the electronic thermostat of FIG. 18.

Referring to FIG. 18 and FIG. 19, the heater for the electronic thermostat according to the ninth embodiment of the present invention has the same structure and manufacturing process as those of the foregoing heater for the electronic thermostat according to the eighth embodiment of the present invention, except that the fitting 700 is additionally provided outside the tube 100.

Therefore, only a technical structure and a manufacturing process different from those of the eighth embodiment will be described avoiding repetitive descriptions.

Referring to FIG. 18, in the heater for the electronic thermostat according to the second embodiment of the present invention, the fitting 700 for screw-coupling the heater for the thermostat to a mounting portion (e.g., the wax casing) is provided outside the tube 100. That is, the fitting 700 is formed with a screw thread 700a on the outer circumference thereof, and put on the outside of the tube 100 through press-fitting.

The tube 100 may be swaged to have a desired shape. Further, a cap 800 is made of an insulating substance and provided in a mouth portion of the fitting 700 so as to close the mouth portion of the fitting 700 while supporting portions of the first lead line 200 and the second lead line 300 exposed to the outside of the tube 100. In addition, an O-ring (not shown) may be provided beneath the cap 800.

Below, processes of manufacturing the heater for the electronic thermostat according to the ninth embodiment of the present invention will be described with reference to FIGS. 18 and 19.

As mentioned above, to avoid repetitive descriptions, descriptions about the same manufacturing processes as those of the eighth embodiment will be omitted, and difference from the eighth embodiment will be mainly described.

Like the processes of manufacturing the heater for the electronic thermostat according to the eighth embodiment, the lead line assembly is first formed and then inserted in the tube 100; the tube 100 is filled with the insulation material 500 such as MgO powder by ultrasonic vibrations; and the packing 600 made of the insulating substance is installed at the opened mouth of the tube 100.

Of course, during the manufacturing processes, the first insulation pipe 910a is put on the first lead line 200, the second insulation pipe 920 is put on the outer circumference of the heating coil 400 of the lead line assembly, and the insulation ring 930 is inserted in the tube 100.

After the heater for the electronic thermostat with the above structure proposed according to the eighth embodiment is manufactured by the foregoing processes, additional processes according to this embodiment are performed so that the fitting 700 for screw-coupling the heater for the thermostat according to this embodiment to the mounting portion of the heater mounting portion (e.g., the wax casing) can be fastened to the outside of the tube 100 through press-fitting, and the cap 800 made of the insulating substance for supporting the first lead line 200 and the second lead line 300 exposed to the outside of the tube 100 can be installed at the mouth of the fitting 700.

According to the ninth embodiment of the present invention, the heater for the electronic thermostat configured and manufactured as described above has effects as follows.

The heater for the electronic thermostat according to this embodiment has a simple structure and a simple manufacturing process and is manufactured by low production costs as compared with the existing electronic thermostat, even though the fitting 700 is provided.

In particular, in the heater for the electronic thermostat according to this embodiment, the insulation is sufficiently secured among parts placed inside the tube 100 (i.e. the tube, the heating coil, the first lead line, and the second lead line), thereby improving the durability and reliability of the heater.

The heater for the electronic thermostat according to this embodiment has a structure where the first lead line 200 and the second lead line 300 for supplying the electric power are insulated from the tube 100, and therefore foreign materials are prevented from being attached to a valve operating portion on outer walls of parts on the contrary to the existing heater for the thermostat.

In other words, the existing heater for the thermostat has the structure where the heating coil and the tube are electrically connected, the tube is electrically connected to the fitting, and the fitting is grounded to a chassis, and therefore electrolysis of a coolant including antifreeze and water based on electric conductivity between the fitting and the wax casing makes foreign materials be attached to the valve operating portion and may cause a malfunction of the electronic thermostat. On the other hand, the heater for the thermostat according to this embodiment of the preset invention fundamentally prevents the electrolysis of the coolant since the tube 100 and the heating coil 400 are insulated from each other.

Accordingly, the heater for the electronic thermostat according to this embodiment has an effect on improving the durability and operation reliability of the electronic thermostat since there is no problem of foreign materials attached to the valve operating portion due to the electrolysis of the coolant.

The present invention is not limited to the foregoing embodiments, and changes and modifications may be variously made without departing from the scope of the invention.

For example, there may be provided an insulation member different from the foregoing insulation pipe 910 shaped like a pipe according to the third and fourth embodiments.

That is, a spacer made of an insulating substance may be provided to prevent contact between the heating coil 400 and the tube 100 inside the tube 100, and between the first lead line 200 and the second lead line 300 and secure insulation by covering not the entire region but a partial region. For instance, the spacer may be given in the form of not a tube, of which the length is greater than the diameter, but a ring of which the diameter is greater than the height.

Further, the insulation pipe 910 shaped like a pipe according to the third and fourth embodiments may be divided into at least two sections along its longitudinal direction, so that the first lead line 200 and the second lead line 300 can be divided into a region for insulating the tube 100 and a region for insulating the heating coil 400 from the tube 100. As the lengths of individual insulation pipes are shortened, it is possible to facilitate assembly of the insulation pipe to the lead line and assembly of the insulation pipe to the heating coil, and it is possible to change order of assembling the insulation pipe, the lead line and the heating coil.

In addition, in the case that the insulation pipe 910 is divided into at least two sections along its lengthwise direction so that one section can be assembled to the first lead line 200 and the second lead line 300 and the other section can be assembled to the heating coil 400, the welded portions are exposed to the outside without being surrounded with the respective divided insulation pipes on the contrary to those of the third and fourth embodiments when the first lead line 200 and the second lead line 300 are connected to both ends of the heating coil 400 having the 'U'-shape and the connected portions are welded, Thus, there is no interruption with the insulation pipes while the connected portions are welded.

Further, in the eighth and ninth embodiments, alternative insulation members different from the first insulation pipe 910a and the second insulation pipe 920 may be provided. For example, a spacer (not shown) of an insulating substance may be provided to prevent contact between the first lead line 200 and the heating coil 400 inside the tube 100, between the heating coil 400 and the tube 100, and between the first lead line 200 and the second lead line 300 and cover not the whole region but a partial region, thereby securing the insulation.

Further, in the first lead line 200 and the second lead line 300 inside the tube 100, a spacer made of an insulating substance may be further provided for insulation between the tube and the first lead line and insulation between the tube and the second lead line with regard to a region above the heating coil 400.

According to an embodiment of the present invention, the heater for the electronic thermostat and the method of manufacturing the same have effects as follows.

On the contrary to a conventional one, the heater for the electronic thermostat according to the first, third, sixth and eighth embodiments of the present invention does not include the fitting, thereby simplifying the structure and the process, improving workability and productivity for mass production when manufactured and assembled, and reducing production costs.

That is, it is possible to effectively reduce an outer diameter since the heater for the electronic thermostat according to the first, third, sixth and eighth embodiments of the present invention does not need a fitting for mounting the heater to the heater mounting portion through screw fastening, and it is also possible to decrease the number of parts and an assembling efficiency since the insulation body, the O-ring and the annular nut are not needed due to the elimination of the fitting.

Although the heater for the electronic thermostat according to the second, fourth, seventh and ninth embodiments of the present invention includes the fitting, this electronic thermostat is structurally simpler than the conventional one, thereby simplifying the process, improving workability and productivity for mass production when manufactured and assembled, and reducing production costs.

In particular, in the heater for the electronic thermostat according to the second, fourth, seventh and ninth embodiments of the present invention, the insulation is sufficiently secured among parts placed inside the tube, thereby improving the durability and reliability of the heater.

The heater for the electronic thermostat according to the foregoing embodiments has a structure where the first and second lead lines for supplying the electric power are insulated from the tube, and therefore foreign materials are prevented from being attached to a valve operating portion on outer walls of parts on the contrary to the existing heater for the thermostat.

In other words, the existing heater for the thermostat has the structure where the heating coil and the tube are electrically connected, the tube is electrically connected to the fitting, and the fitting is grounded to a chassis, and therefore electrolysis of a coolant including antifreeze and water based on electric conductivity between the fitting and the wax casing makes foreign materials be attached to the valve operating portion and may cause a malfunction of the electronic thermostat. On the other hand, the heater for the thermostat according to the first to ninth embodiments of the preset invention fundamentally prevents the electrolysis of the coolant since the tube and the heating coil are insulated from each other.

Accordingly, the heater for the electronic thermostat according to all the embodiments of the present invention has an effect on improving the durability and operation reliability of the electronic thermostat since there is no problem of foreign materials attached to the valve operating portion due to the electrolysis of the coolant.

Further, the heater for the electronic thermostat according to all the embodiments of the present invention improves response so that time taken in increasing the heating temperature up to the target temperature can be shortened, thereby more effectively controlling the temperature of the coolant than the existing thermostat, and thus enhancing the fuel efficiency of a vehicle.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A heater for an electronic thermostat, comprising:
   a tube which comprises a hollow structure of which one end is opened and the other end is closed;
   a first lead line which comprises a first end portion exposed to an outside of the tube and a second end portion placed inside the tube and receives electric power from an exterior through the first end portion exposed to the outside of the tube;
   a second lead line which comprises a first end portion exposed to the outside of the tube and a second end portion placed inside the tube and is installed to be spaced apart from the first lead line;
   a heating coil which is disposed in the tube and electrically connects the first lead line and the second lead line to generate heat based on electrical resistance;
   an insulation material which is filled in the tube;
   a packing which is installed inside a mouth of the tube and made of an insulating substance serving as a support for supporting and maintaining the first lead line and the second lead line to be spaced apart from each other;
   an insulation pipe which is disposed in an inner space formed by the tube and the packing and encloses the first and second lead lines for securing insulation around the first and second lead lines placed inside the tube; and
   an insulation ring for securing insulation between the heating coil inside the tube and a closed end portion of the tube,
   wherein the insulation pipe encloses the first and second lead lines and the heating coil that are disposed within the tube.

2. The heater for the electronic thermostat according to claim 1, wherein the heating coil comprises a first end connected to a front end portion of the first lead line inside the tube and a second end connected to a front end portion of the second lead line inside the tube, and is shaped like a 'U'-shape.

3. The heater for the electronic thermostat according to claim 2, wherein the connection between the first end of the heating coil and the front end portion of the first lead line inside the tube, and the connection between the second end of the heating coil and the front end portion of the second lead line inside the tube are achieved by respectively inserting the first lead line and the second lead line in both ends of the heating coil, and applying electric resistance welding or laser welding to the inserted portions.

4. The heater for the electronic thermostat according to claim 3, wherein the first lead line and the second lead line placed inside the tube are configured to have the same length.

5. The heater for the electronic thermostat according to claim 1, further comprising a fitting which is formed with a screw thread on an outer circumference thereof and put on the outside of the tube through press-fitting so that the heater can be screw-coupled to the heater mounting portion.

6. The heater for the electronic thermostat according to claim 5, further comprising a cap which is made of an insulating substance and provided in a mouth portion of the fitting so as to close the mouth portion of the fitting while supporting portions of the first and second lead lines exposed to the outside of the tube.

7. The heater for the electronic thermostat according to claim 1, wherein the insulation pipe encloses portions of the first and second lead lines that extend into the inner space beyond the packing.

8. The heater for the electronic thermostat according to claim 1, wherein the insulation pipe is disposed in an inner space of the tube closed by the packing and encloses the first and second lead lines.

9. A method of manufacturing a heater for an electronic thermostat, the method comprising:
    preparing a tube comprising a hollow structure of which one end is opened and the other end is closed;
    preparing a first lead line and a second lead line to be inserted in the tube;
    preparing a 'U'-shaped heating coil bent with respect to a middle of a coil spring;
    connecting a first end of the 'U'-shaped heating coil with the first lead line and a second end of the heating coil with the second lead line;
    installing an insulation pipe to enclose the first and second lead lines and the heating coil for securing insulation;
    inserting the heating coil, the first and second lead lines connected to the heating coil, and the insulation pipe in the tube;
    filling the tube with an insulation material;
    installing packing made of an insulating substance at an opened mouth of the tube; and
    inserting an insulation ring having an opening before the inserting the heating coil, the first and second lead lines, and the insulation pipe,
    wherein the opening of the insulation ring passes through a body of the insulation ring, and
    wherein the opening of the insulation ring is filled with the insulation material after filling the tube with the insulation material.

10. A heater for an electronic thermostat, comprising:
    a tube which comprises a hollow structure of which one end is opened and the other end is closed;
    a first lead line which comprises a first end portion exposed to an outside of the tube and a second end portion placed inside the tube and receives electric power from an exterior through the first end portion exposed to the outside of the tube;
    a second lead line which comprises a first end portion exposed to the outside of the tube and a second end portion placed inside the tube and is installed to be spaced apart from the first lead line;
    a heating coil which is disposed in the tube and electrically connects the first lead line and the second lead line to generate heat based on electrical resistance;
    an insulation material which is filled in the tube;
    a packing which is installed inside a mouth of the tube and made of an insulating substance serving as a support for supporting and maintaining the first lead line and the second lead line to be spaced apart from each other;
    an insulation pipe which is disposed in an inner space formed by the tube and the packing and encloses the first and second lead lines for securing insulation around the first and second lead lines placed inside the tube; and
    an insulation ring for securing insulation between the heating coil inside the tube and a closed end portion of the tube,
    wherein the insulation ring includes an opening passing through a body of the insulation ring.

11. The heater for the electronic thermostat according to claim 10, wherein the opening of the insulation ring is filled with the insulation material.

\* \* \* \* \*